US012584030B2

(12) United States Patent
Asakawa

(10) Patent No.: US 12,584,030 B2
(45) Date of Patent: Mar. 24, 2026

(54) INK JET INK COMPOSITION AND RECORDING METHOD

(71) Applicant: SEIKO EPSON CORPORATION, Tokyo (JP)

(72) Inventor: Yuta Asakawa, Azumino (JP)

(73) Assignee: SEIKO EPSON CORPORATION (JP)

( * ) Notice: Subject to any disclaimer, the term of this patent is extended or adjusted under 35 U.S.C. 154(b) by 141 days.

(21) Appl. No.: 18/410,422

(22) Filed: Jan. 11, 2024

(65) Prior Publication Data

US 2024/0254349 A1 Aug. 1, 2024

(30) Foreign Application Priority Data

Jan. 12, 2023 (JP) ................................. 2023-003213

(51) Int. Cl.
*C09D 11/322* (2014.01)
*B41J 2/01* (2006.01)
(Continued)

(52) U.S. Cl.
CPC ............... *C09D 11/322* (2013.01); *B41J 2/01* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609;
(Continued)

(56) References Cited

U.S. PATENT DOCUMENTS

2019/0030882 A1* 1/2019 Aoki ........................... B41J 2/01
2020/0391533 A1* 12/2020 Gotou .................... B41J 2/2107
(Continued)

FOREIGN PATENT DOCUMENTS

JP 2022-085548 A 6/2022

*Primary Examiner* — Manish S Shah
(74) *Attorney, Agent, or Firm* — Harness, Dickey & Pierce, P.L.C.

(57) ABSTRACT

An ink jet ink composition according to an embodiment of the present disclosure is an aqueous ink jet ink composition containing a color material, a silicone-based surfactant, and a water-soluble low-molecular-weight organic compound, in which the ink jet ink composition is used for recording on a recording medium that is a low-absorptive recording medium or a non-absorptive recording medium, and the silicone-based surfactant has a cloud point of 30° C. or higher when mixed at a mass ratio of silicone-based surfactant:propylene glycol:water=1:9:90, and has a surface tension of 30 mN/m or less in each of a 0.1% by mass aqueous solution and a 0.1% by mass propylene glycol solution.

16 Claims, 1 Drawing Sheet

(51) Int. Cl.
    *B41J 2/21*         (2006.01)
    *B41M 5/00*       (2006.01)
    *B41M 7/00*       (2006.01)
    *C09D 11/033*    (2014.01)
    *C09D 11/38*     (2014.01)
    *C09D 11/40*     (2014.01)
    *C09D 11/54*     (2014.01)

(52) U.S. Cl.
    CPC .......... *B41M 5/0017* (2013.01); *B41M 7/009*
    (2013.01); *C09D 11/033* (2013.01); *C09D*
    *11/38* (2013.01); *C09D 11/40* (2013.01); *C09D*
    *11/54* (2013.01)

(58) Field of Classification Search
    CPC ... B41J 2/164; B41J 2/162; B41J 2/161; B41J
    2/19; B41J 15/04; B41J 25/001; B41J
    25/34; B41J 25/003; B41J 2/18; B41J
    25/312; B41J 2025/008; B41J 2202/21;
    B41J 2/17596; B41J 2/16508; B41J
    2/1652; B41J 2/175; B41J 2/17563; C09D
    11/36; C09D 11/40; C09D 11/30; C09D
    11/38; C09D 11/32; C09D 11/322; C09D
    11/324; C09D 11/328; C09D 11/101;
    C09D 11/102; C09D 11/005; C09D
    11/54; C09D 11/52; C09D 11/106; B41M
    5/0011; B41M 5/0017; B41M 5/0023;
    B41M 5/0047; B41M 7/00; B41M
    7/0072; B41M 5/52; B41M 5/5218;
    B41M 5/5227
    See application file for complete search history.

(56)             References Cited

U.S. PATENT DOCUMENTS

| | | | |
|---|---|---|---|
| 2022/0169873 A1 | 6/2022 | Ishida | |
| 2022/0204792 A1* | 6/2022 | Shimura | ............... C09D 11/08 |
| 2023/0058241 A1* | 2/2023 | Asakawa | .............. C09D 11/38 |

* cited by examiner

INK JET INK COMPOSITION AND RECORDING METHOD

The present application is based on, and claims priority from JP Application Serial Number 2023-003213, filed Jan. 12, 2023, the disclosure of which is hereby incorporated by reference herein in its entirety.

BACKGROUND

1. Technical Field

The present disclosure relates to an ink jet ink composition and a recording method.

2. Related Art

Ink jet recording methods can record high-definition images with a relatively simple device, and achieve rapid development in various fields. Among them, in recording of images on a low-absorptive recording medium or a non-absorptive recording medium (hereinafter, also referred to as "low- or non-absorptive media"), a use of an aqueous ink composition in which water is one of main solvents is examined.

For example, JP-A-2022-85548 discloses a white ink composition which is an aqueous ink jet ink, contains a white color material and a fixing resin, and is used for recording on a low-absorptive recording medium or a non-absorptive recording medium.

However, in recording on low- or non-absorptive media, the ink was less likely to wet-spread on the media, the image was insufficiently embedded, and the image quality (embedding) was likely to deteriorate.

On the other hand, when using an ink composition that is likely to wet-spread in order to improve the embedding of the image, flight bending of ink droplets occurred in ink ejection by an ink jet method, and a landing position deviation occurred.

Therefore, there is a demand for an ink jet ink composition that can obtain excellent image quality (embedding) and is excellent in suppressing the landing position deviation.

SUMMARY

According to an aspect of the present disclosure, there is provided an ink jet ink composition that includes an aqueous ink jet ink composition containing a color material, a silicone-based surfactant, and a water-soluble low-molecular-weight organic compound, in which the ink jet ink composition is used for recording on a recording medium that is a low-absorptive recording medium or a non-absorptive recording medium, and the silicone-based surfactant has a cloud point of 30° C. or higher when mixed at a mass ratio of silicone-based surfactant:propylene glycol:water=1:9:90, and has a surface tension of 30 mN/m or less in each of a 0.1% by mass aqueous solution and a 0.1% by mass propylene glycol solution.

According to another aspect of the present disclosure, there is provided a recording method that includes an adhering step of ejecting the ink jet ink composition of the one aspect from an ink jet head and adhering the ink jet ink composition to a recording medium which is a low-absorptive recording medium or a non-absorptive recording medium.

DESCRIPTION OF EMBODIMENTS

Figure 1:
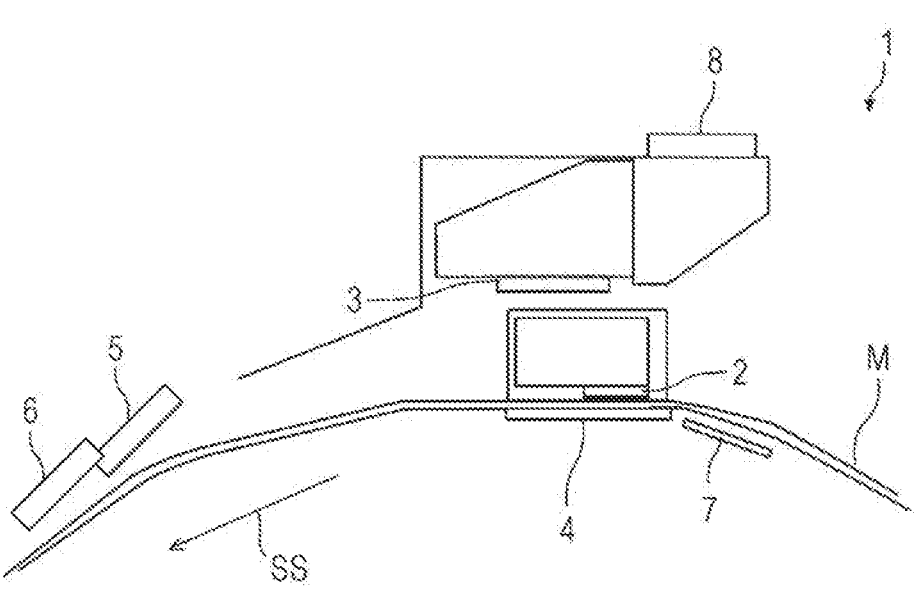
FIG. 1 is a schematic view of an example of an ink jet recording device.

Hereinafter, embodiments of the present disclosure will be described. The embodiments described below describe examples of the present disclosure. The present disclosure is not limited to the following embodiments, and includes various modifications implemented within a range not changing a gist of the present disclosure. It should be noted that not all of the configurations described below are essential configurations of the present disclosure.

In the present specification, "(meth)acrylic" means acrylic or methacrylic, and "(meth)acrylate" means acrylate or methacrylate.

1. Ink Jet Ink Composition

An ink jet ink composition according to one embodiment of the present disclosure is an aqueous ink jet ink composition containing a color material, a silicone-based surfactant, and a water-soluble low-molecular-weight organic compound, which is used for recording on a recording medium that is a low-absorptive recording medium or a non-absorptive recording medium, in which the silicone-based surfactant has a cloud point of 30° C. or higher when mixed at a mass ratio of silicone-based surfactant:propylene glycol:water=1:9:90, and has a surface tension of 30 mN/m or less in each of a 0.1% by mass aqueous solution and a 0.1% by mass propylene glycol solution.

In the related art, in the recording on the low- or non-absorptive media, the ink was less likely to wet-spread on the media, the image was insufficiently embedded, and the image quality (embedding) was likely to deteriorate. Therefore, it was recognized that by using the silicone-based surfactant, in which a surface tension of the aqueous solution is a predetermined value or less and a surface tension of the propylene glycol solution is a predetermined value or less, for the ink, the wet-spreading is improved, and the excellent image quality (embedding) can be obtained. It is presumed that this is because when the surfactant is the above-mentioned silicone-based surfactant, the ink can be wet-spread on the low- or non-absorptive media from a state where water is large immediately after adhering to the media to a state where drying of water proceeds and the organic solvent is large.

Here, in the related art, as the silicone-based surfactant as mentioned above, which can wet-spread even in a state where the organic solvent is large, a surfactant having high hydrophobicity (lower HLB value) is used. There was a case where such silicone-based surfactants having high hydrophobicity tended to have low solubility in water, were difficult to dissolve in aqueous inks, and thus phase separation was caused. Therefore, in an ink containing a silicone-based surfactant having high hydrophobicity, flight bending of ink droplets occurred due to ejection by an ink jet method, and landing position deviation occurred.

Therefore, as a result of the intensive examination by the present discloser, it was found that the silicone-based surfactant that causes the landing position deviation as mentioned above has a low cloud point in a solution of water and propylene glycol. Therefore, by using the silicone-based surfactant, which has an excellent balance of hydrophobicity and water solubility, that is, the silicone-based surfactant, in which a cloud point is a predetermined value or higher, a surface tension of the aqueous solution is a predetermined value or less, and a surface tension of the propylene glycol solution is a predetermined value or less, for the ink, the wet-spreading was improved, the excellent image quality (embedding) was obtained, and the suppression of the landing position deviation was also excellent.

Hereinafter, components contained in the ink jet ink composition according to the present embodiment will be described.

1.1 Color Material

The ink jet ink composition according to the present embodiment contains a color material. The color material may be a pigment or a dye.

1.1.1 Pigment

As the pigment, an inorganic pigment including carbon black and titanium white, an organic pigment, and the like can be used.

As the inorganic pigment, carbon black (C.I. Pigment Black 7) such as furnace black, lamp black, acetylene black, and channel black, iron oxide, titanium oxide, zinc oxide, silica, and the like can be used.

Examples of the carbon black include No. 2300, 900, MCF88, No. 20B, No. 33, No. 40, No. 45, No. 52, MA7, MA8, MA100, No2200B, and the like, manufactured by Mitsubishi Chemical Corporation. Examples include color black FW1, FW2, FW2V, FW18, FW200, S150, S160, S170, Pretex 35, U, V, 140U, special black 6, 5, 4A, 4, 250, and the like, manufactured by Degussa Corporation. Examples include Conductex SC, Raven 1255, 5750, 5250, 5000, 3500, 1255, 700, and the like, manufactured by Columbia Carbon Company. Examples include Regal 400R, 330R, and 660R, Mogul L, Monarch 700, 800, 880, 900, 1000, 1100, 1300, and 1400, Elftex 12, and the like, manufactured by Cabot Corporation.

Examples of the organic pigment include a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolo-pyrrole-based pigment, a perinone-based pigment, a quinophthalone-based pigment, an anthraquinone-based pigment, a thioindigo-based pigment, a benzoimidazolone-based pigment, an isoindolinone-based pigment, an azomethine-based pigment, an azo-based pigment, or the like.

Specific examples of the organic pigment used in the ink jet ink composition include the followings.

Examples of the cyan pigment include C.I. Pigment Blue 1, 2, 3, 15:3, 15:4, 15:6, 15:34, 16, 22, 60, and the like; C.I. Vat Blue 4, 60; and the like, and preferably include a mixture of one or two or more selected from the group consisting of C.I. Pigment Blue 15:3, 15:4, and 60.

Examples of the magenta pigment include C.I. Pigment Red 5, 7, 12, 48 (Ca), 48 (Mn), 57 (Ca), 57:1, 112, 122, 123, 168, 184, 202, C.I. Pigment Violet 19, and the like, and preferably include a mixture or a solid solution of one or two or more selected from the group consisting of C.I. Pigment Red 122, 202, and 209, and C.I. Pigment Violet 19.

Examples of the yellow pigment include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, 185, and the like, and preferably include a mixture of one or two or more selected from the group consisting of C.I. Pigment Yellow 74, 109, 110, 128, 138, 155, and 180.

Examples of the orange pigment include C.I. Pigment Orange 36 or 43 or a mixture thereof. Examples of the green pigment include C.I. Pigment Green 7 or 36 or a mixture thereof.

In addition, a bright pigment may be used, the pigment is not particularly limited as long as it is able to exhibit brightness when adhered to a medium, and examples thereof include metal particles of one or two or more alloys (also referred to as metal pigment) selected from the group consisting of aluminum, silver, gold, platinum, nickel, chromium, tin, zinc, indium, titanium, and copper, a pearl pigment having pearl gloss, or the like. Representative examples of the pearl pigment include a pigment having pearl gloss and interference gloss such as titanium dioxide-coated mica, fish scale foil, and bismuth oxychloride. In addition, the bright pigment may be subjected to a surface treatment for suppressing a reaction with water.

In addition, the white pigment may be used, and examples of the white pigment include metal compounds such as metal oxide, barium sulfate, and calcium carbonate. Examples of the metal oxide include titanium dioxide, zinc oxide, silica, alumina, magnesium oxide, and the like. In addition, particles having a hollow structure may be used for the white pigment.

The above-mentioned pigments may be used alone or in combination of two or more thereof. The pigment is preferably an organic pigment from the viewpoint of storage stability such as light resistance, weather resistance, and gas resistance.

The pigment may be used by being dispersed using a pigment dispersant. Further, the pigment may be used by being dispersed as a self-dispersing pigment by oxidizing or sulfonating a pigment surface with ozone, hypochlorous acid, fuming sulfuric acid, and the like.

The pigment dispersant has a function of dispersing the pigment in the ink jet ink composition. As the pigment dispersant, a water-insoluble resin or at least a partially water-soluble resin can be used. The pigment dispersant is preferably not completely water-soluble. It is considered that the pigment dispersant disperses the pigment by increasing the hydrophilicity of the surface of the pigment by being bonded or adsorbed to the pigment in part or as a whole. The type of the pigment dispersant is not particularly limited.

The pigment dispersant is a polymer compound, and examples thereof include acrylic resin such as poly(meth) acrylic acid, (meth)acrylic acid-acrylonitrile copolymer, (meth)acrylic acid-(meth)acrylic acid ester copolymer, vinyl acetate-(meth)acrylic acid ester copolymer, vinyl acetate-(meth)acrylic acid copolymer, vinylnaphthalene-(meth) acrylic acid copolymer, styrene-(meth)acrylic acid copolymer, styrene-(meth)acrylic acid copolymer, styrene-(meth) acrylic acid-(meth)acrylic acid ester copolymer, styrene-α-methylstyrene-(meth)acrylic acid copolymer, and styrene-α-methylstyrene-(meth)acrylic acid-(meth)acrylic acid ester copolymer, and salts thereof. In the present specification, a polymer having a skeleton derived from (meth)acrylic acid and not having a skeleton derived from maleic acid or similar compounds is referred to as an acrylic resin.

In addition, examples of the pigment dispersant include resins such as maleic acid-based resin such as styrene-maleic acid copolymer, styrene-maleic anhydride copolymer, vinylnaphthalene-maleic acid copolymer, and vinyl acetate-maleic acid ester copolymer and salts thereof; urethane-based resin with or without a cross-linked structure and salts thereof; polyvinyl alcohols; and vinyl acetate-crotonic acid copolymer and salts thereof.

The acrylic resin may be a copolymer of an acrylic monomer and another monomer, in addition to the polymer of the acrylic monomer as mentioned above. For example, an acrylic vinyl resin which is a copolymer with a vinyl-based monomer as another monomer is also referred to as an acrylic resin. In addition, for example, among the above-mentioned styrene-based resins, those which are copolymers of a styrene-based monomer and an acrylic monomer are also included in the acrylic resin. In addition, when referring to the acrylic resin, the salt and the esterified product thereof are also included.

Examples of commercially available products of the pigment dispersant include X-200, X-1, X-205, X-220, and X-228 (manufactured by Seiko PMC Corporation), Nop-cospars (registered trademark) 6100 and 6110 (manufactured by San Nopco Ltd.), Joncryl 67, 586, 611, 678, 680, 682, and 819 (manufactured by BASF Japan Ltd.), DIS-PERBYK-190 (manufactured by BYK Japan KK), N-EA137, N-EA157, N-EA167, N-EA177, N-EA197D, N-EA207D, and E-EN10 (manufactured by DKS Co., Ltd.), and the like.

Examples of commercially available products of the acrylic pigment dispersant include DISPERBYK-187, DIS-PERBYK-190, DISPERBYK-191, DISPERBYK-194N, and DISPERBYK-199 (manufactured by BYK Japan KK), Aron A-210, A6114, AS-1100, AS-1800, A-30SL, A-7250, and CL-2 (manufactured by Toagosei Co., Ltd.), and the like.

Examples of commercially available products of ure-thane-based pigment dispersant include DISPERBYK-182, DISPERBYK-183, DISPERBYK-184, and DISPERBYK-185 (manufactured by BYK Japan KK), TEGO Disperse 710 (manufactured by Evonic Tego Chemi), Borchi (registered trademark) Gen 1350 (manufactured by OMG Borchers), and the like.

The pigment dispersant may be used alone, or may be used in combination of two or more. A total content of the pigment dispersant is 0.1% by mass or more and 30% by mass or less, preferably 0.5% by mass or more and 25% by mass or less, more preferably 1% by mass or more and 20% by mass or less, and further more preferably 1.5% by mass or more and 15% by mass or less with respect to 100% by mass of the ink. By setting the content of the pigment dispersant to 0.1% by mass or more, dispersion stability of the pigment can be ensured. In addition, when the content of the pigment dispersant is 30% by mass or less, the viscosity of the ink jet ink composition can be suppressed to be small.

In addition, a weight average molecular weight of the pigment dispersant is more preferably 500 or more. By using such a pigment dispersant, the odor is reduced and the dispersion stability of the pigment can be made more favorable.

When the pigment is dispersed by the pigment dispersant, a ratio of the pigment to the pigment dispersant is preferably 10:1 to 1:10, and more preferably 4:1 to 1:3.

In addition, as for a volume average particle diameter (D50) of the pigment, a volume average particle diameter (D50) when measured by a dynamic light scattering method is 20 nm or more and 300 nm or less, more preferably the volume average particle diameter (D50) is 30 nm or more and 200 nm or less, and further more preferably the volume average particle diameter (D50) is 40 nm or more and 100 nm or less.

When the ink jet ink composition contains a pigment dispersed by a pigment dispersant, the pigment dispersant is preferably made of an acrylic resin. Due to this, the dispersibility of the pigment in the ink jet ink composition can be made more favorable.

1.1.2 Dye

A dye may be used as a color material in the ink jet ink composition. Although the dye is not particularly limited, acid dyes, direct dyes, reactive dyes, basic dyes, and dispersion dye can be used. Examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 132, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, 141, and 249, and C.I. Reactive Black 3, 4, and 35.

These color materials may be used alone or in combination of two or more, regardless of whether the color material is a pigment or a dye.

A total content of the color material is preferably 0.10% by mass or more and 20.0% by mass or less, more preferably 0.20% by mass or more and 15.0% by mass or less, further more preferably 1.0% by mass or more and 10.0% by mass or less, and particularly preferably 1.0% by mass or more and 5.0% by mass or less with respect to a total mass (100% by mass) of the ink jet ink composition. The ink jet ink composition may be a clear composition (clear ink) which contains a color material to such an extent that the purpose is not to be colored (for example, 0.1% by mass or less).

1.2 Specific Silicone-Based Surfactant

The ink jet ink composition according to the present embodiment contains a silicone-based surfactant (specific silicone-based surfactant), which has a cloud point of 30° C. or higher when mixed at a mass ratio of silicone-based surfactant:propylene glycol:water=1:9:90, and in which a surface tension is 30 mN/m or less in each of a 0.1% by mass aqueous solution and a 0.1% by mass propylene glycol solution.

1.2.1 Cloud Point

The specific silicone-based surfactant has a cloud point of 30° C. or higher when mixed at a mass ratio of silicone-based surfactant:propylene glycol:water=1:9:90.

A measurement method of the above-mentioned cloud point is performed as follows, for example. First, a solution mixed at a mass ratio of silicone-based surfactant:propylene glycol:water=1:9:90 is stirred for 30 minutes or more. Thereafter, 20 g of the mixture solution is placed in a 30 mL sample bottle, and left for 1 day in a constant temperature bath at a predetermined temperature. After being left for one day, when the liquid is visually observed and is in a mixed state (liquid is transparent), it can be determined that the liquid has a cloud point equal to or higher than a predetermined temperature. On the other hand, when liquid is in a cloudiness state or is in a state in which a separated product is present, it can be determined that the liquid does not have a cloud point equal to or higher than a predetermined temperature.

The cloud point is preferably 35° C. or higher, more preferably 40° C. or higher, further more preferably 45° C. or higher, particularly preferably 50° C. or higher, and more particularly preferably higher than 50° C. When the cloud point is within the above-mentioned range, the solubility of the silicone-based surfactant in water tends to be further improved, and the landing position deviation tends to be able to be further suppressed. In addition, an upper limit of the above-mentioned cloud point is not particularly limited, but is preferably 100° C. or lower, more preferably 80° C. or lower, further more preferably 70° C. or lower, and particularly preferably 60° C. or lower.

1.2.2 Surface Tension

The specific silicone-based surfactant is a surfactant in which a surface tension is 30 mN/m or less in each of a 0.1% by mass aqueous solution and a 0.1% by mass propylene glycol solution.

The measurement method of the above-mentioned surface tension is performed as follows, for example. A solution mixed at a mass ratio of silicone-based surfactant:water=0.1:99.9 and a solution mixed at a mass ratio of silicone-based surfactant:propylene glycol=0.1:99.9 are stirred for 30 minutes or more. The solution after stirring is measured by a Wilhelmy method using a platinum plate in an environment of 25° C. using an automatic surface tension meter CBVP-Z (manufactured by Kyowa Interface Science Co., Ltd.).

The surface tension of the 0.1% by mass aqueous solution of the specific silicone-based surfactant is not particularly limited as long as the surface tension is 30 mN/m or less, but is preferably 28 mN/m or less, and more preferably 26 mN/m or less. A lower limit is not particularly limited, and may be 10 mN/m or more, 15 mN/m or more, and 20 mN/m or more. The surface tension of the 0.1% by mass propylene glycol solution of the specific silicone-based surfactant is not particularly limited as long as the surface tension is 30 mN/m or less, but is preferably 29 mN/m or less, and more preferably 28 mN/m or less. A lower limit is not particularly limited, and may be 10 mN/m or more, 15 mN/m or more, and 20 mN/m or more.

As the specific silicone-based surfactant, a commercially available product may be used, and examples thereof include BYK-3420 (manufactured by BYK Japan KK) and Silface SAG502 (manufactured by Nissin Chemical Industry Co., Ltd.).

In the ink jet ink composition according to the present embodiment, a content of the above-mentioned specific silicone-based surfactant is preferably 2% by mass or less, more preferably 1.7% by mass or less, further more preferably 1.5% by mass or less, even more preferably 1.3% by mass or less, particularly preferably 1.0% by mass or less, and more particularly preferably 0.8% by mass or less with respect to the total mass of the ink composition. Even when the content of the above-mentioned specific silicone-based surfactant is within the above-mentioned range, excellent image quality (embedding) having favorable wet-spreading is obtained, and phase separation is unlikely to occur and the landing position deviation tends to be able to be further suppressed. In addition, a lower limit of the above-mentioned content is not particularly limited, but is preferably 0.1% by mass or more, more preferably 0.2% by mass or more, and further more preferably 0.3% by mass or more.

1.3 Water-Soluble Low-Molecular-Weight Organic Compound

The ink jet ink composition according to the present embodiment contains a water-soluble low-molecular-weight organic compound.

In the water-soluble low-molecular-weight organic compound, the "water-soluble" means that the solubility is more than 10% by mass in water at 20° C. For example, after the compound is mixed in water at a predetermined concentration at 20° C. and stirred, the compound is considered to be dissolved in water when the remaining undissolved is not visible or the entire mixture solution does not look cloudy, by visual observation. When a minimum concentration of the compound mixed in water is more than 10% by mass when being dissolved in water, the compound is water-soluble. The & by mass when indicating the solubility is the % by mass of the low-molecular-weight organic compound with respect to a total mass of the mixture solution in which water and the low-molecular-weight organic compound are mixed.

In the water-soluble low-molecular-weight organic compound, the "low-molecular-weight" means that the molecular weight is 500 or less. The molecular weight is preferably 400 or less, and more preferably 300 or less. The molecular weight is further more preferably 50 to 200.

The water-soluble low-molecular-weight organic compound may be an organic solvent which is a liquid at room temperature alone, or may be a solid at room temperature alone. The water-soluble low-molecular-weight organic compound is preferably an organic solvent.

Examples of the water-soluble low-molecular-weight organic compound include esters, alkylene glycol ethers, cyclic esters, alcohols, polyhydric alcohols, amides, sulfur-containing substances, cyclic ethers, and the like.

Examples of the esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxy butyl acetate, and glycol diesters such as ethylene glycol diacetate, diethylene glycol diacetate, propylene glycol diacetate, dipropylene glycol diacetate, ethylene glycol acetate propionate, ethylene glycol acetate butylate, diethylene glycol acetate butylate, diethylene glycol acetate propionate, diethylene glycol acetate butylate, propylene glycol acetate propionate, propylene glycol acetate butylate, dipropylene glycol acetate butylate, and dipropylene glycol acetate propionate, and the like.

The alkylene glycol ethers may be alkylene glycol monoethers or diethers, and are preferably alkyl ethers. Specific examples include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether; and the like.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone; compounds in which a hydrogen of a methylene group adjacent to a carbonyl group thereof is substituted with an alkyl group having 1 to 4 carbon atoms, and the like.

Examples of alcohols include a compound in which one hydrogen atom of alkane is substituted with a hydroxyl group. The alkane preferably has 10 or less carbon atoms, more preferably 6 or less carbon atoms, and further more preferably 3 or less carbon atoms. The number of carbon atoms of the alkane is 1 or more, and is preferably 2 or more. The alkane may be a linear type or a branched type. Examples of alcohols include methanol, ethanol, n-propyl alcohol, iso-propyl alcohol, n-butanol, 2-butanol, tert-butanol, iso-butanol, n-pentanol, 2-pentanol, 3-pentanol, tert-pentanol, 2-phenoxy ethanol, benzyl alcohol, phenoxy propanol, and the like.

Polyhydric alcohols have two or more hydroxyl groups in the molecule. Examples of polyhydric alcohols include alkanediols and polyols.

Examples of alkanediols include compounds in which alkane is substituted with two hydroxyl groups. Examples of alkanediols include 1,2-alkanediol, which is a general term for compounds in which hydroxyl groups are substituted at the first and second positions of alkanes, and other alkanediols other than 1,2-alkanediol.

Examples of 1,2-alkanediol include ethylene glycol, propane-1,2-diol (propylene glycol), 1,2-butanediol (1,2BD), 1,2-pentanediol (1,2PD), 1,2-hexanediol (1,2HD), 1,2-heptanediol, 1,2-octanediol, 1,2-nonanediol, 1,2-decanediol, 3-methyl-1,2-butanediol, 3-methyl-1,2-pentanediol, 4-methyl-1,2-pentanediol, 3,4-dimethyl-1,2-pentanediol, 3-ethyl-1,2-pentanediol, 4-ethyl-1,2-pentanediol, 3-methyl-1,2-hexanediol, 4-methyl-1,2-hexanediol, 5-methyl-1,2-hexanediol, 3,4-dimethyl-1,2-hexanediol, 3,5-dimethyl-1,2-hexanediol, 4,5-dimethyl-1,2-hexanediol, 3-ethyl-1,2-hexanediol, 4-ethyl-1,2-hexanediol, 3-ethyl-4-methyl-1,2-hexanediol, and the like.

Among the 1,2-alkanediols, 1,2-alkanediols having 4 or more and 6 or less carbon atoms are preferable. The alkyl group of 1,2-alkanediol having an alkyl group having 4 or more and 6 or less carbon atoms may be linear or branched, and examples thereof include an n-butyl group, an iso-butyl group, a tert-butyl group, a linear or branched pentyl group, and a linear or branched hexyl group. 1,2-alkanediol having 4 or more and 6 or less carbon atoms is preferably one or more selected from 1,2-butanediol, 1,2-pentanediol, and 1,2-hexanediol, and is more preferably 1,2-hexanediol.

The ink jet ink composition according to the present embodiment preferably contains 7% by mass or less of 1,2-alkanediol having 4 or more and 6 or less carbon atoms, and more preferably contains 1% by mass or more and 7% by mass or less of 1,2-alkanediol, as a water-soluble low-molecular-weight organic solvent, with respect to the total mass of the ink composition. A lower limit is more preferably 1.2% by mass or more, further more preferably 1.4% by mass or more, even more preferably 1.6% by mass or more, particularly preferably 1.8% by mass or more, and more particularly preferably 2.0% by mass or more. An upper limit is more preferably 6% by mass or less, further more preferably 5% by mass or less, even more preferably 4% by mass or less, particularly preferably 3.5% by mass or less, and more particularly preferably 3% by mass or less. When a content of the 1,2-alkanediol having 4 or more and 6 or less carbon atoms is within the above range, there is a tendency that the solubility of the silicone-based surfactant is further improved and the ink landing position deviation can be further suppressed.

Examples of other alkanediols include 1,3-propanediol, 1,3-butylene glycol (also known as 1,3-butanediol), 1,4-butanediol, 2,3-butanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, 2-methyl-2-propyl-1,3-propanediol, and the like.

The ink jet ink composition according to the present embodiment preferably contains alkanediols having a standard boiling point of 180° C. to 215° C. as a water-soluble low-molecular-weight organic compound. In such a case, there is a tendency that the solubility of the surfactant is excellent, favorable drying properties are obtained, and the abrasion resistance becomes more excellent. In addition, from the viewpoint of obtaining more favorable drying properties, alkanediols having a standard boiling point of 180° C. to 210° C. are more preferable, alkanediols having a standard boiling point of 180° C. to 200° C. are further more preferable, and alkanediols having a standard boiling point of 180° C. to 190° C. are particularly preferable.

Examples of alkanediols having a standard boiling point of 180° C. to 215° C. include propylene glycol (standard boiling point 188° C.), 1,3-propanediol (standard boiling point 213° C.), and the like.

From the viewpoint of a tendency of more excellent abrasion resistance, the content of alkanediols having a standard boiling point of 180° C. to 215° C. is preferably 5% to 40% by mass, more preferably 10% to 30% by mass, and further more preferably 15% to 20% by mass with respect to the total mass of the ink composition.

Examples of the polyols include a condensate in which two or more molecules of alkanediols are intermolecularly condensed between hydroxyl groups, a compound having three or more hydroxyl groups, and the like.

Examples of the condensate in which two or more molecules of alkanediols are intermolecularly condensed between hydroxyl groups include dialkylene glycol such as diethylene glycol and dipropylene glycol, trialkylene glycol such as triethylene glycol and tripropylene glycol, and the like.

The compound having three or more hydroxyl groups is a compound having three or more hydroxyl groups having an alkane or polyether structure as a skeleton. Examples of the compound having three or more hydroxyl groups include glycerin, trimethylolethane, trimethylolpropane, 1,2,5-hexanetriol, 1,2,6-hexanetriol, pentaerythritol, polyoxypropylenetriol, and the like.

It is more preferable that the ink jet ink composition does not contain more than 1.0% by mass of polyhydric alcohols having a standard boiling point of higher than 280.0° C. In the ink jet ink composition, a content of the polyhydric alcohols having a standard boiling point of higher than 280° C. is preferably 5% by mass or less, more preferably 3% by mass or less, further more preferably 1% by mass or less, particularly preferably 0.5% by mass or less, and more particularly preferably 0.1% by mass or less, with respect to the total mass of the ink jet ink composition. A lower limit of the content of the polyhydric alcohols having a standard boiling point of higher than 280° C. may be 0% by mass. Here, when the polyhydric alcohols are not contained in an amount of more than X % by mass, this means that the content is X % by mass or less, and means that the content is not contained or is X % by mass or less. The ink jet ink composition may contain polyhydric alcohols having a standard boiling point of 280° C. or higher, such as trimethylolpropane and glycerin, depending on the necessity.

By doing so, drying of the formed image becomes favorable, recording can be performed faster, and the adhesion properties to the recording medium can also be improved. In addition, the ink jet ink composition more preferably has a water-soluble low-molecular-weight organic compound (not limited to the polyhydric alcohol) having a standard boiling point of higher than 280.0° C. in the above-mentioned range. Examples of the water-soluble low-molecular-weight organic compound having a standard boiling point of higher than 280° C. include glycerin, polyethylene glycol monomethyl ether, and the like.

The amides may be water-soluble low-molecular-weight organic compounds having an amide structure. Examples of the amides include cyclic amides, acyclic (chain) amides, and the like. Examples of the acyclic amides include alkoxyalkylamides and the like.

Examples of the cyclic amides include lactams. Examples of the lactams include pyrrolidones such as 2-pyrrolidone (standard boiling point of 245° C.), 1-methyl-2-pyrrolidone, 1-ethyl-2-pyrrolidone, 1-propyl-2-pyrrolidone, and 1-butyl-2-pyrrolidone. In addition, examples thereof include caprolactams such as ε-caprolactam and N-methyl-ε-caprolactam.

Examples of alkoxyalkylamides include 3-methoxy-N, N-dimethylpropionamide, 3-methoxy-N, N-diethylpropionamide, 3-methoxy-N, N-methylethylpropionamide, 3-ethoxy-N, N-dimethylpropionamide, 3-ethoxy-N, N-diethylpropionamide, 3-ethoxy-N, N-methylethylpropionamide, 3-n-butoxy-N, N-dimethylpropionamide, 3-n-butoxy-N, N-diethylpropionamide, 3-n-butoxy-N, N-methylethylpropionamide, 3-n-propoxy-N, N-dimethylpropionamide, 3-n-propoxy-N, N-diethylpropionamide, 3-n-propoxy-N, N-methylethylpropionamide, 3-iso-propoxy-N, N-dimethylpropionamide, 3-iso-propoxy-N, N-diethylpropionamide, 3-iso-propoxy-N, N-methylethylpropionamide, 3-tert-butoxy-N, N-dimethylpropionamide, 3-tert-butoxy-N, N-diethylpropionamide, 3-tert-butoxy-N, N-methylethylpropionamide, N, N-dimethylisobutyrate amide, and the like.

The sulfur-containing substances may be any water-soluble low-molecular-weight organic compound having a sulfur atom in the molecule. Examples of the sulfur-containing substances include sulfones such as sulfolane and 3-methylsulfolane; sulfoxides; and the like.

The cyclic ethers may be any water-soluble low-molecular-weight organic compound having a cyclic ether structure. Examples thereof include those having a cyclic ether structure of 4 to 8 member rings. The number of oxygen atoms constituting the ring is preferably 1 to 3. Examples thereof include oxetanes such as 3-ethyl-3-oxetanemethanol; sol ketals such as sol ketal; and the like.

The water-soluble low-molecular-weight organic solvent may be used alone, or may be used in combination of two or more.

In the ink jet ink composition according to the present embodiment, the water-soluble low-molecular-weight organic compound having a standard boiling point of 215° C. or lower is preferably 60% by mass or more, more preferably 70% by mass or more, further more preferably 75% by mass or more, particularly preferably 80% by mass or more, more particularly preferably 85% by mass or more, further more particularly preferably 90% by mass or more, and even further more particularly preferably 95% by mass or more, with respect to the total mass of the water-soluble low-molecular-weight organic compound. An upper limit is preferably 100% by mass or less. When the content of the water-soluble low-molecular-weight organic compound having a standard boiling point of 215° C. or lower is within the above-mentioned range with respect to the total mass of the water-soluble low-molecular-weight organic compound, there is a tendency that favorable drying properties are obtained, and the abrasion resistance is more excellent.

In the ink jet ink composition according to the present embodiment, the content of the water-soluble low-molecular-weight organic compound is preferably 30% by mass or less, more preferably 28% by mass or less, further more preferably 26% by mass or less, even further more preferably 24% by mass or less, particularly preferably 22% by mass or less, and more particularly preferably 20% by mass or less, with respect to the total mass of the ink composition. A lower limit is not particularly limited, but for example, is preferably 5% by mass or more, more preferably 10% by mass or more, and further more preferably 15% by mass or more. When the content of the water-soluble low-molecular-weight organic compound is within the above-mentioned range with respect to the total mass of the ink composition, there is a tendency that favorable drying properties are obtained, and the abrasion resistance is more excellent.

1.4. Water

The ink jet ink composition according to the present embodiment is an aqueous composition containing water. "Aqueous" means that at least water is contained as a solvent component, and water may be contained as a main solvent component. Examples of the water include pure water such as ion-exchanged water, ultra-filtered water, reverse osmosis water, and distilled water, water having reduced ionic impurities such as ultrapure water, and the like. In addition, when water sterilized by irradiation with ultraviolet rays or addition of hydrogen peroxide or the like is used, the generation of bacteria and fungi can be suppressed when the ink jet ink composition is stored for a long period of time.

A content of water is preferably 30% by mass or more, and more preferably 30% to 99% by mass in a liquid medium component. In addition, the content of water is preferably 30% to 95% by mass, more preferably 40% to 90% by mass, and further more preferably 50% to 80% by mass. The liquid medium is a solvent component such as water and a water-soluble low-molecular-weight organic compound.

In addition, the content of water is preferably 40% by mass or more, more preferably 45% by mass or more, further more preferably 50% by mass or more, and particularly preferably 60% by mass or more, with respect to the total mass of the ink composition. An upper limit of the content of water is not particularly limited, but for example, is 99% by mass or less, preferably 90% by mass or less, more preferably 85% by mass or less, and further more preferably 80% by mass or less, with respect to the total mass of the ink composition.

1.5 Fixing Resin

The ink jet ink composition according to the present embodiment may contain a fixing resin. The fixing resin has a function of improving the adhesion properties of a component of the ink composition adhered to a recording medium and of being able to further improve the friction fastness. Examples of such a fixing resin include urethane resin, acrylic resin (including styrene acrylic resin), fluorene resin, olefin resin, rosin-modified resin, terpene resin, ester resin, amide resin, epoxy resin, vinyl chloride resin, vinyl chloride-vinyl acetate copolymer, and an ethylene vinyl acetate resin, and the like. These fixing resins may be in the form of particles (resin particles) and are often handled in the form of an emulsion, but may be in the form of powder.

The urethane resin is a general term for a resin having a urethane skeleton, and refers to a resin including a urethane bond, a urea bond, or an allophanate bond formed by the reaction of an isocyanate group with an active hydrogen-containing group such as a hydroxyl group, an amino group, a urethane bonding group, and a carboxyl group. For the urethane resin, a polyether-type urethane resin including an ether skeleton in the main chain, a polyester-type urethane resin including an ester skeleton in the main chain, a polycarbonate-type urethane resin including a carbonate skeleton in the main chain, and the like, in addition to a urethane skeleton, can be used.

An acrylic resin is a general term for polymers obtained by polymerizing at least an acrylic monomer such as (meth) acrylic acid and (meth)acrylic acid ester as one component, and examples thereof include a resin obtained from an acrylic monomer, a copolymer of an acrylic monomer and a monomer other than the acrylic monomer, and the like. As the acrylic monomer, acrylamide, acrylonitrile, and the like can also be used.

Examples of the acrylic resin include an acrylic-vinyl resin which is a copolymer between an acrylic monomer and a vinyl monomer, a copolymer between an acrylic monomer and a vinyl monomer such as styrene, and the like. Among these, the styrene acrylic resin is a copolymer obtained from a styrene monomer and an acrylic monomer, and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, and the like. As the fixing resin of the styrene acrylic resin, a commercially available product may be used, for example, Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, 7610 (product name, manufactured by BASF Japan Ltd.), Movinyl 966A, 975N (product name, manufactured by Nippon Synthetic Chemical Industry Co., Ltd.), Vinyblan 2586 (manufactured by Nissin Chemical Industry Co., Ltd.), and the like may be used.

The olefin resin is a resin having a structure derived from an olefin such as ethylene, propylene, and butylene, and known ones can be appropriately selected and used.

The fixing resin can be used alone or used in combination of two or more.

A content when containing a fixing resin is preferably 1% by mass or more and 15% by mass or less, more preferably 1.5% by mass or more and 10% by mass or less, and further more preferably 2% by mass or more and 8% by mass or less with respect to the total mass of the ink composition. When the content of the fixing resin is within the above-mentioned range, there is a tendency that the balance between the abrasion resistance and the suppression of the ink landing position deviation can be improved.

1.6 Other Components

The ink jet ink composition according to the present embodiment may include an additive such as pH adjuster, preservative and fungicide, rust inhibitor, chelating agent, viscosity modifier, dissolution aid, and antioxidant, depending on the necessity. A content when containing such an additive is preferably 0.1% to 5% by mass, more preferably 0.1% to 3% by mass, and further more preferably 0.1% to 1% by mass, with respect to the total amount of the ink composition.

1.7. Method of Producing Ink Composition

The ink jet ink composition according to the present embodiment is obtained by mixing the above-mentioned components with one another in an optional order and removing impurities by filtering or the like depending on the necessity. As a method of mixing each component, a method of sequentially adding materials to a container equipped with a stirrer such as a mechanical stirrer and a magnetic stirrer and stirring and mixing is appropriately used. As a filtration method, centrifugal filtration, filter filtration, and the like can be carried out, depending on the necessity.

1.8 Physical Properties of Ink Composition

From the viewpoint of balance between recording quality and reliability as an ink for ink jet recording, the ink jet ink composition according to the present embodiment preferably has a surface tension at 25° C. of 10 mN/m or more and 40 mN/m or less, and more preferably has a surface tension of 25 mN/m or more and 40 mN/m or less. The surface tension can be measured by checking the surface tension when a platinum plate becomes wet with an ink in an environment of 25° C. using an automatic surface tension meter CBVP-Z (product name, manufactured by Kyowa Interface Science Co., Ltd.).

In addition, from the same viewpoint, a viscosity of the ink jet ink composition at 20° C. is preferably 2 mPa·s or more and 15 mPa·s or less, more preferably 2 mPa·s or more and 5 mPa·s or less, and further more preferably 2 mPa·s or more and 3.6 mPa·s or less. The viscosity can be measured in an environment at 20° C. using a viscoelasticity tester MCR-300 (product name, manufactured by Pysica).

1.9 Use

Hereinafter, the use of the ink jet ink composition according to the present embodiment will be described.

1.9.1 Recording Medium

The ink jet ink composition according to the present embodiment is used for recording on a recording medium which is a low-absorptive recording medium or a non-absorptive recording medium. In recording on such a recording medium, the ink is unlikely to wet-spread on the recording medium, the image is insufficiently embedded, and the image quality (embedding) is likely to deteriorate. However, according to the ink jet ink composition according to the present embodiment, even when the ink jet ink composition is used for recording on such a recording medium, excellent image quality (embedding) is obtained, and suppression of the landing position deviation is also excellent.

The "low-absorptive recording medium or non-absorptive recording medium" in the present specification refers to a recording medium having properties of not absorbing a liquid at all or almost not absorbing a liquid. Quantitatively, the "low-absorptive recording medium or non-absorptive recording medium" refers to "a recording medium in which a water absorption amount from the start of contact to 30 $msec^{1/2}$ in the Bristow method is 10 $mL/m^2$ or less". The Bristow method is the most popular method as a method of measuring a liquid absorption amount in a short time, and is also adopted by the Japan Technical Association of the Pulp and Paper Industry (JAPAN TAPPI). Details of a test method are described in "Paper and Paperboard-Liquid-Absorptivity Test Method-Bristow Method" of Standard No. 51 of "JAPAN TAPPI Paper and Pulp Test Method 2000 Edition".

The low-absorptive recording media are not particularly limited, and examples thereof include coated paper having a coating layer for receiving an ink on a surface. The coated paper is not particularly limited, and examples thereof include printing paper such as art paper, coated paper, and matte paper. The coating layer hardly absorbs an ink, and examples thereof include a layer in which particles such as inorganic compounds are coated with a binder.

The non-absorptive recording medium is not particularly limited, and examples thereof include a recording medium such as plastic, glass, metal, and ceramic.

When the recording medium is plastic, there is a plastic film and the like, for example. Examples of the plastic film include a polyester film, a polyurethane film, a polycarbonate film, a polyphenylene sulfide film, a polyimide film, a polyamide imide film, and the like. Other examples include polyolefins such as polyethylene and polypropylene, polyvinyl chloride, and the like. In addition, examples thereof also include a biomass-derived plastic film, and examples thereof can include PLA, PBS, PHA, bioPE, bioPP, bioPET, and the like.

In addition, a film made of plastic may also be used, and those in which plastic is applied onto a base material such as paper and those in which a plastic film is adhered onto a base material such as paper may also be used.

When the recording medium is metal, a base material made of metal such as iron, silver, copper, and aluminum, or those in which various metals thereof are vapor-deposited on a recording surface of a base material other than metal such as plastic may be used. That is, those of which the recording surface is made of metal may be used.

The recording medium may be a recording medium having light transmittance such as colorless transparent, semi-transparent, or colored transparent. Alternatively, the recording medium may be those not having light transmittance such as chromatic opaque and achromatic opaque. In addition, as the recording medium, an article having a three-dimensional shape such as a sheet shape, a spherical shape, and a rectangular parallelepiped shape, a paper container, and the like may be used.

1.9.2 Recording Method

The ink jet ink composition according to the present embodiment may be used in a recording method including the following steps.

Treatment Liquid Adhering Step

The ink jet ink composition according to the present embodiment may be used in a recording method including a step (treatment liquid adhering step) of adhering a treatment liquid containing an aggregating agent to the above-described recording medium. Details of the treatment liquid adhering step will be described later.

In recording on a low- or non-absorptive medium, an ink is hardly absorbed on a recording medium, and thus there is a tendency that ink bleeding occurs and image quality deteriorates. Therefore, in order to deteriorate fluidity of the ink, fix a position of ink droplets early, and suppress ink bleeding, it is considered to use a treatment liquid containing an aggregating agent. However, in this case, since the wet-spreading of the ink is further suppressed, the image quality (embedding) is more likely to deteriorate. In contrast, according to the ink jet ink composition according to the present embodiment, even when used in a recording method including such a treatment liquid adhering step, excellent image quality (embedding) can be obtained.

Primary Drying Step

When adhering an ink jet ink composition to a recording medium, the ink jet ink composition according to the present embodiment may be used in a recording method including a primary drying step of drying an ink jet ink composition adhered to the recording medium. Details of the primary drying step will be described later.

In the recording method including the primary drying step, since the drying of the ink is promoted and the wet-spreading of the ink is further suppressed, the image quality (embedding) is more likely to deteriorate. In addition, an ink jet head used for recording is easily affected by heating or air blowing in the primary drying step, and the amount of moisture in the ink in the vicinity of a nozzle may decrease due to drying. In this case, the solubility of the silicone-based surfactant in the ink deteriorates, phase separation proceeds, and the ink landing position deviation is particularly likely to occur. In contrast, according to the ink jet ink composition according to the present embodiment, even when used in a recording method including such a primary drying step, excellent image quality (embedding) can be obtained, and suppression of the landing position deviation is also excellent.

2. Recording Method

A recording method according to an embodiment of the present disclosure includes an adhering step of ejecting the above-described ink jet ink composition from an ink jet head and adhering the ink jet ink composition to a recording medium which is a low-absorptive recording medium or a non-absorptive recording medium.

According to the recording method according to the present embodiment, since the above-described ink jet ink composition is used, excellent image quality (embedding) can be obtained, and the suppression of the landing position deviation is also excellent.

Hereinafter, each step of the recording method according to the present embodiment will be described.

2.1 Ink Adhering Step

The recording method according to the present embodiment includes an adhering step (ink adhering step) of ejecting the above-mentioned ink jet ink composition from an ink jet head and adhering the ink jet ink composition to a recording medium which is a low-absorptive recording medium or a non-absorptive recording medium.

The ink adhering step is preferably performed by an ink jet method in which an ink jet ink composition is ejected from an ink jet head. In addition, the ink adhering step can be easily executed by an ink jet recording device. Details of the ink jet recording device will be described later. A composition in which an ink is ejected from an ink jet head by an ink jet method and used for recording is referred to as an ink jet ink composition.

The adhesion amount of the ink composition is preferably 30 mg/inch$^2$ or less per unit area of the recording medium. In addition, the adhesion amount is preferably 0.5 to 30 mg/inch$^2$, more preferably 5 to 28 mg/inch$^2$, and further more preferably 10 to 25 mg/inch$^2$.

A maximum adhesion amount per unit area in a recording region of the recording medium to which the ink composition is adhered may be in the above-mentioned range.

The ink adhering step may be performed at a surface temperature of the recording medium of 50° C. or lower. That is, the ink adhering step may be performed without heating the recording medium, or may be performed with heating. In addition, when heating the recording medium, the resulting temperature may be set as the surface temperature of the recording medium in the primary drying step by heating, which will be described later. The above-mentioned temperature may be a maximum temperature during recording, and may be measured by a thermocouple, a non-contact type thermometer, or the like.

In addition, the ink adhering step may also include an ink adhering step of ejecting and recording the ink jet ink composition in a state of being heated to 28° C. or higher and 50° C. or lower. The temperature of the heated ink is preferably 30° C. or higher, more preferably 32° C. or higher, and further more preferably 34° C. or higher. On the other hand, the temperature of the heated ink is preferably 48° C. or lower, more preferably 46° C. or lower, further more preferably 44° C. or lower, and particularly preferably 42° C. or lower. As described above, when the ink is heated, since the drying of the ink is promoted and the wet-spreading of the ink is further suppressed, the image quality (embedding) is more likely to deteriorate. In addition, when the amount of moisture in the ink decreases due to drying, the solubility of the silicone-based surfactant deteriorates, the phase separation proceeds, and the ink landing position deviation is particularly likely to occur. In contrast, according to the recording method according to the present embodiment, even when heating is performed within the above-mentioned range, there is a tendency that the image quality (embedding) or the suppression of the landing position deviation is excellent.

The heating may be, for example, performed at a temperature of an ink jet head nozzle surface which ejects the composition when the ink composition is ejected from the ink jet head. This is because the temperature of the composition at the time of ejection is substantially the temperature of the nozzle surface. The heating may be obtained by raising the temperature by heat generation and the like of the recording device such as the ink jet head itself, or may be obtained by being affected by heat of the primary drying step or secondary drying step to be described later. The temperature of the heated ink may be measured by a thermocouple and the like.

In addition, the recording method according to the present embodiment may be a recording method in which the above-mentioned ink jet ink composition is continuously recorded on a recording medium for one hour or more. The recording is preferably continuous for 1.2 hours or more, more preferably continuous for 1.4 hours or more, further more preferably continuous for 1.6 hours or more, particularly preferably continuous for 1.8 hours or more, and more particularly preferably continuous for 2 hours or more. An upper limit is not particularly limited, but is preferably 5 hours or less, more preferably 3 hours or less, and further more preferably 2.5 hours or less. As described above, when recording is continuously performed for a long time, the ink landing position deviation is likely to occur. In contrast, according to the recording method according to the present embodiment, even when recording is continuously performed for a long time, there is a tendency that the suppression of the landing position deviation is excellent.

2.2 Treatment Liquid Adhering Step

The recording method according to the present embodiment may include a step (treatment liquid adhering step) of adhering a treatment liquid containing an aggregating agent to the above-described recording medium.

2.2.1 Adhering Aspect

As a method of adhering a treatment liquid to a recording medium, any method of non-contact type and contact type methods such as an ink jet method, a method by coating, a method of coating a recording medium with a treatment liquid using various sprays, a method of coating by immersing a recording medium in a treatment liquid, and a method of coating a recording medium with a treatment liquid using a brush and the like or a method of combination of these can be used.

The treatment liquid adhering step may be performed by an ink jet recording device. In this manner, the treatment liquid and the ink jet ink composition can be adhered to the recording medium with one ink jet recording device, and thus the step is more preferable.

The adhesion amount of the treatment liquid is preferably 5 mg/inch$^2$ or less, more preferably 0.1 to 5 mg/inch$^2$, more preferably 0.5 to 4 mg/inch$^2$, and further more preferably 1 to 3 mg/inch$^2$, per unit area of the recording medium.

A maximum adhesion amount of the treatment liquid per unit area in a recording region of the recording medium in which the treatment liquid and the ink composition are adhered may be in the above-mentioned range.

2.2.2 Treatment Liquid

Hereinafter, each component contained in the treatment liquid will be described. The treatment liquid is not an ink composition used for performing coloring on a recording medium, but an auxiliary liquid used together with the ink composition. In addition, the treatment liquid is preferably one that can aggregate or thicken the components of the ink composition, and more preferably contains an aggregating agent that aggregates or thickens the components of the ink composition. The treatment liquid may contain a color material such as pigment, but the content of the color material is preferably 0.2% by mass or less, more preferably 0.1% by mass or less, and further more preferably 0.05% by mass or less with respect to a total mass of the treatment liquid, and a lower limit is 0% by mass. The treatment liquid preferably does not contain a color material.

Aggregating Agent

The treatment liquid contains an aggregating agent. The aggregating agent has a function of aggregating at least one of these components by acting on the dispersibility of the components such as the pigment and the resin included in the ink jet ink composition. A degree of aggregation of a dispersion by the aggregating agent differs depending on each type of the aggregating agent and the target, and can be adjusted. For example, by such aggregating action, color developing properties of the image and fixing properties of the image can be enhanced.

The aggregating agent is not particularly limited, but examples thereof include a metal salt, an acid, a cationic compound, and the like, and as the cationic compound, a cationic resin (cationic polymer), a cationic surfactant, and the like can be used. Among these, a polyvalent metal salt is preferably the metal salt, and a cationic resin is preferably the cationic compound. Examples of the acid include an organic acid and an inorganic acid, and the organic acid is preferable. Therefore, the aggregating agent is preferably those selected from a cationic resin, an organic acid, and a polyvalent metal salt in the point that the obtained image quality, abrasion resistance, gloss, and the like are particularly excellent.

The metal salt is preferably a polyvalent metal salt, but a metal salt other than the polyvalent metal salt can also be used. Among these aggregating agents, at least one type selected from a metal salt and an organic acid is preferably used from the viewpoint of excellent reactivity with components included in the ink. In addition, among the cationic compounds, a cationic resin is preferably used from the viewpoint of easy dissolution in the treatment liquid. In addition, a plurality of aggregating agents can be used in combination.

The polyvalent metal salt is a compound formed of a divalent or higher metal ion and an anion. Examples of the divalent or higher metal ion include ions such as calcium, magnesium, copper, nickel, zinc, barium, aluminum, titanium, strontium, chromium, cobalt, and iron. Among the metal ions constituting these polyvalent metal salts, the metal ion is preferably at least one of calcium ion and magnesium ion from the viewpoint of excellent aggregating properties of ink components.

The anion constituting the polyvalent metal salt is an inorganic ion or an organic ion. That is, the polyvalent metal salt in the present disclosure is formed of inorganic ions or organic ions and polyvalent metals. Examples of such inorganic ions include chloride ion, bromine ion, iodine ion, formate ion, nitrate ion, sulfate ion, hydroxide ion, and the like. Examples of the organic ion include an organic acid ion, and examples thereof include a carboxylic acid ion.

Specific examples of the polyvalent metal salts include calcium carbonate such as heavy calcium carbonate and light calcium carbonate, calcium formate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, aluminum acetate, calcium propionate, magnesium propionate, aluminum propionate, calcium lactate, magnesium lactate, aluminum lactate, and the like. These polyvalent metal salts may be used alone or in combination of two or more. Among these, the polyvalent metal salt is preferably at least one of magnesium sulfate, calcium formate, calcium nitrate, aluminum lactate, and calcium propionate from the viewpoint of obtaining sufficient solubility in water. In addition, these metal salts may have hydration water in the form of a raw material.

Examples of the metal salt other than the polyvalent metal salt include monovalent metal salts such as sodium salt and potassium salt, and examples thereof include sodium sulfate, potassium sulfate, and the like.

Preferred examples of the organic acid include poly(meth) acrylic acid, formic acid, acetic acid, propionic acid, glycolic acid, oxalic acid, malonic acid, malic acid, maleic acid, ascorbic acid, succinic acid, glutaric acid, adipic acid, fumaric acid, citric acid, tartrate acid, lactic acid, pyruvic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, or salts thereof. The organic acid may be used alone or in combination of two or more. Salts of organic acids that are metal salts are included in the metal salts.

Examples of the inorganic acid include sulfuric acid, hydrochloric acid, nitric acid, phosphoric acid, and the like. The inorganic acid may be used alone or in combination of two or more.

Examples of the cationic resin (cationic polymer) include a cationic urethane-based resin, a cationic olefin-based resin, a cationic amine-based resin, a cationic surfactant, and the like.

Commercially available products can be used as the cationic urethane-based resin, and for example, Hydran CP-7010, CP-7020, CP-7030, CP-7040, CP-7050, CP-7060, CP-7610 (product name, manufactured by DIC Corporation), Superflex 600, 610, 620, 630, 640, 650 (product name, manufactured by DKS Co., Ltd.), urethane emulsion WBR-2120C, WBR-2122C (product name, manufactured by Taisei Fine Chemical Co., Ltd.), and the like can be used.

The cationic olefin resin is a resin having an olefin such as ethylene and propylene in the structural skeleton, and known ones can be appropriately selected and used. In addition, the cationic olefin resin may be in an emulsion state of being dispersed in a solvent containing water, an organic solvent, and the like. As the cationic olefin resin, a commercially available product can be used, and examples thereof include Arrow base CB-1200 and CD-1200 (product name, manufactured by Unitika Ltd.).

As the cationic amine-based resin (cationic polymer), any resin having an amino group in the structure may be used, and known ones can be appropriately selected and used. Examples thereof include polyamine resin, polyamide resin, polyallylamine resin, and the like. The polyamine resin is a resin having an amino group in the main skeleton of the resin. The polyamide resin is a resin having an amide group in the main skeleton of the resin. The polyallylamine resin is a resin having a structure derived from an allyl group in the main skeleton of the resin.

In addition, examples of the cationic polyamine-based resin include Unisense KHE103L (hexamethylenediamine/epichlorohydrin resin, 1% aqueous solution of pH of substantially 5.0, viscosity 20 to 50 (mPa·s), aqueous solution of solid content concentration of 50% by mass) manufactured by Senka Corporation, Unisense KHE104L (dimethylamine/epichlorohydrin resin, 1% aqueous solution of pH of substantially 7.0, viscosity 1 to 10 (mPa·s), aqueous solution of solid content concentration of 20% by mass), and the like. In addition, specific examples of commercially available products of the cationic polyamine-based resin include FL-14 (manufactured by SNF), Arafix 100, 251S, 255, 255LOX (manufactured by Arakawa Chemical Industries, Ltd.), DK-6810, 6853, 6885; WS-4010, 4011, 4020, 4024, 4027, 4030 (manufactured by Seiko PMC Corporation), Papiogen P-105 (manufactured by Senka Corporation), Sumirez Resin 650 (30), 675A, 6615, SLX-1 (manufactured by Taoka Chemical Co., Ltd.), Catiomaster (registered trademark) PD-1, 7, 30, A, PDT-2, PE-10, PE-30, DT-EH, EPA-SK01, TMHMDA-E (manufactured by Yokkaichi Chemical Co., Ltd.), Jetfix 36N, 38A, 5052 (manufactured by Satoda Chemical Industrial Co., Ltd.), and the like.

Examples of the polyallylamine resin include polyallylamine hydrochloride, polyallylamine amide sulfate, allylamine hydrochloride/diallylamine hydrochloride copolymer, allylamine acetate/diallylamine acetate copolymer, allylamine hydrochloride/dimethyl allylamine hydrochloride copolymer, allylamine/dimethylallylamine copolymer, polydiallylamine hydrochloride, polymethyldiallylamine hydrochloride, polymethyldiallylamine amide sulfate, polymethyldiallylamine acetate, polydiallyldimethylammonium chloride, diallylamine acetate/sulfur dioxide copolymer, diallyl methyl ethyl ammonium ethyl sulfate/sulfur dioxide copolymer, methyl diallylamine hydrochloride/sulfur dioxide copolymer, diallyldimethylammonium chloride/sulfur dioxide copolymer, diallyldimethylammonium chloride/acrylamide copolymer, and the like.

Examples of the cationic surfactant include primary, secondary, and tertiary amine salt type compounds, alkylamine salts, dialkylamine salts, aliphatic amine salts, benzalconium salts, quaternary ammonium salts, quaternary alkylammonium salt, alkylpyridinium salt, sulfonium salt, phosphonium salt, onium salt, imidazolinium salt, and the like. Specific examples thereof include hydrochlorides such as laurylamine, coconut amine, and rosinamine, and acetates, lauryltrimethylammonium chloride, cetyltrimethylammonium chloride, benzyltributylammonium chloride, benzalkonium chloride, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, octadecyldimethylammonium chloride, and the like.

A plurality of types of these aggregating agents may be used. In addition, when at least one type of the polyvalent metal salt, organic acid, and cationic resin is selected from these aggregating agents, the aggregating action is better, and thus an image of higher image quality (in particular, favorable color developing properties) can be formed.

A lower limit of the content of the aggregating agent is, for example, preferably 0.1% by mass or more, more preferably 0.5% by mass or more, further more preferably 1% by mass or more, and particularly preferably 1.5% by mass or more, with respect to the total mass of the treatment liquid. In addition, an upper limit of the content of the aggregating agent is, for example, preferably 30% by mass or less, more preferably 20% by mass or less, further more preferably 10% by mass or less, particularly preferably 7% by mass or less, and more particularly preferably 5% by mass or less, with respect to the total mass of the treatment liquid.

In addition, even when the water-soluble low-molecular-weight organic compound that may be included in the treatment liquid has high hydrophobicity, from the viewpoint of favorable solubility of the aggregating agent in the treatment liquid, it is preferable to use an aggregating agent in which the solubility in 100 g of water at 25° C. is 1 g or more, and more preferable to use an aggregating agent in which the solubility is 3 g or more and 80 g or less.

Water-Soluble Low-Molecular-Weight Organic Compound

The treatment liquid may contain a water-soluble low-molecular-weight organic compound from the viewpoint that the abrasion resistance or the image quality tends to be further improved. The types, the content, or the like of the water-soluble low-molecular-weight organic compound can be the same as that of the above-described ink jet ink composition.

Specific Silicone-Based Surfactant

From the viewpoint that the abrasion resistance or the image quality tends to be further improved, the treatment liquid may contain a silicone-based surfactant which has a cloud point of 30° C. or higher when mixed at a mass ratio of the silicone-based surfactant:propylene glycol:water=1: 9:90, and in which a surface tension is 30 mN/m or less in each of a 0.1% by mass aqueous solution and a 0.1% by mass propylene glycol solution (specific silicone-based surfactant). Physical properties such as the cloud point or the surface tension, the content, and the like of the specific silicone-based surfactant can be the same as those of the above-described ink jet ink composition.

Water

The treatment liquid may be an aqueous composition containing water. The type, the content, or the like of water can be the same as those of the above-described ink jet ink composition.

Other Components

The treatment liquid may contain additives such as pH adjuster, preservative and fungicide, rust inhibitor, chelating agent, viscosity modifier, dissolution aid, and antioxidant, depending on the necessity. A content when containing such an additive is preferably 0.1% to 5% by mass, more preferably 0.1% to 3% by mass, and further more preferably 0.1% to 1% by mass, with respect to the total amount of the treatment liquid.

In addition, the method of producing the treatment liquid and the physical properties such as the surface tension and viscosity can be the same as those of the above-described ink jet ink composition.

2.3 Primary Drying Step

The recording method according to the present embodiment may include a primary drying step of drying the ink jet ink composition adhered to the recording medium when adhering the above-described ink jet ink composition to the recording medium. By including such a step, there is a tendency that the drying properties of the ink can be improved at an early stage when the ink composition is adhered to the recording medium, and bleeding can be suppressed, and thus excellent image quality (aggregation unevenness) is obtained. On the other hand, when the primary drying step is included, as described above, the image quality (embedding) is likely to deteriorate or the ink landing position deviation is likely to occur. In contrast, according to the recording method according to the present embodiment, even when the primary drying step is included, the image quality (embedding) or the suppression of the ink landing position deviation is excellent.

The primary drying step is a step of performing drying of the ink at an early stage when the ink composition is adhered to the recording medium. The primary drying step is a drying step for drying at least a part of a solvent component in the ink adhered to the recording medium to an extent that at least flow of the ink is reduced. The ink droplets landed on the recording medium preferably start to be dried by the primary drying step within 0.5 seconds at a speed from the landing of the ink droplets.

Examples of methods for the primary drying step include a blower type, which is a method based on normal temperature air blowing (normal temperature air) or air blowing (warm air) associated with heating, to the recording medium by a fan and the like, a radiation type of IR heater and microwave, a heat transfer type based on heating the recording medium by a platen heater or the like, a method combining the above types, or the like. Here, the primary drying step is not particularly limited as long as it can improve the drying properties of the ink, and may be a method accompanying heating or a method not accompanying heating. The blower type drying will be described below as an air blowing step.

2.3.1 Primary Drying Step by Heating

The recording method according to the present embodiment may include a primary drying step by heating, in which a surface temperature of the recording medium is 28° C. or higher and 55° C. or lower at the time of adhesion of the above-described ink jet ink composition. Even when such a primary drying step by heating is included, the recording method according to the present embodiment is excellent in the image quality (embedding) and suppression of the ink landing position deviation, and there is a tendency that bleeding can be further suppressed, and the image quality (aggregation unevenness) is more excellent. A lower limit of the surface temperature of the recording medium is preferably 30° C. or higher, more preferably 32° C. or higher, and further more preferably 35° C. or higher. In addition, an upper limit of the surface temperature of the recording medium is preferably 52° C. or lower, more preferably 50° C. or lower, and further more preferably 47° C. or lower.

When the primary drying step by heating is included, in the primary drying step, the ink may be adhered to the heated recording medium, or the recording medium may be heated early after the ink adhesion. In addition, when being heated early after the ink adhesion, heating preferably starts within 0.5 seconds from the landing of the ink droplets on the recording medium.

When the primary drying step by heating is included, heating may be performed at least before the above-described ink adhering step, at the same time as the adhesion, or early after the adhesion, and is preferably performed at the same time. The ink adhering step can be performed in such a heating order.

When the ink is adhered to the recording medium on which the primary drying step is performed, the surface temperature of the recording medium in the primary drying step can be said to be a surface temperature of the recording medium at the time of the above-described ink adhering step. In addition, when the primary drying step is performed early after the ink adhesion, the surface temperature is a surface temperature of the recording medium when the primary drying step is performed, and is the maximum temperature in the primary drying step. In addition, the surface temperature of the recording medium when the heating is not accompanied in the primary drying step is the surface temperature of the recording medium at the time of the ink adhesion.

2.3.2 Air Blowing Step

The recording method according to the present embodiment may include, in the primary drying step, an air blowing step of air blowing at an air velocity of 1 m/s or more and 4 m/s or less at the time of adhesion of the above-described ink jet ink composition. Even when such an air blowing step is included, there is a tendency that the recording method according to the present embodiment is excellent in the image quality (embedding) or the suppression of the ink landing position deviation, can further suppress bleeding, and is more excellent in the image quality (aggregation unevenness).

An air velocity in the air blowing can be appropriately set, and may be 0.5 to 15 m/s, may be 0.5 to 10 m/s, may be 1 to 5 m/s, and is more preferably 2 to 3 m/s. The air velocity is an air velocity in the vicinity of the surface of the recording medium (on-paper air velocity).

An air temperature in the air blowing is preferably 50° C. or lower, and more preferably 10° C. or higher. In addition, the air temperature in the air blowing is preferably 15° C. to 45° C., and is more preferably 20° C. to 49° C. In addition, the air temperature in the air blowing is preferably 23° C. to 40° C., more preferably 25° C. to 35° C., and further more preferably 25° C. to 28° C. The air temperature in the air blowing may be a normal temperature. When warm air is blown, the air blowing step can be said to be the primary drying step by heating.

2.4 Secondary Drying Step

The recording method according to the present embodiment may include a secondary drying step of adhering the above-described ink jet ink composition to a recording medium, causing the recording medium to pass through a platen, and then drying the ink jet ink composition adhered to the recording medium.

The secondary drying step is a step in which recording is completed and the recorded material is sufficiently dried to the extent that the recorded material can be used. The secondary drying step is a drying step for sufficiently drying a solvent component of the ink and heating the fixing resin and the like that can be contained in the ink to flatten the ink coating film. In the secondary drying step, after all of the ink adhered to a certain region in the recording medium is adhered, the drying may start after more than 1 second, for example.

The secondary drying step can be performed by using an appropriate drying unit. The secondary drying step is performed by, for example, an after-heater (corresponding to a heating heater 5 in an example of the ink jet recording device 1 described later). In addition, the drying unit is not limited to the heating unit included in the ink jet recording device, and other drying units may be used.

In the secondary drying step, a lower limit of the surface temperature of the recording medium is preferably 50° C. or higher, more preferably 60° C. or higher, and further more preferably 70° C. or higher. In addition, an upper limit of the surface temperature of the recording medium is preferably 120° C. or lower, more preferably 110° C. or lower, further more preferably 100° C. or lower, and particularly preferably 90° C. or lower. When the temperature of the recording medium is in this range, there is a tendency that the fixing resin that can be contained in the recorded material can be filmed and flattened, and the obtained image can be dried and more sufficiently fixed. The temperature preferable in the primary drying step is preferably different from the temperature preferable in the secondary drying step.

2.5 Other Steps

The recording method according to the present embodiment may include a laminating step and the like performed by laminating a film such as attaching a film to a recording surface of the recording medium to which the ink jet ink composition is adhered, depending on the necessity.

2.6 Ink Jet Recording Device

An example of an ink jet recording device that can be used in the recording method according to the present embodiment will be described with reference to drawings.

Figure 2:
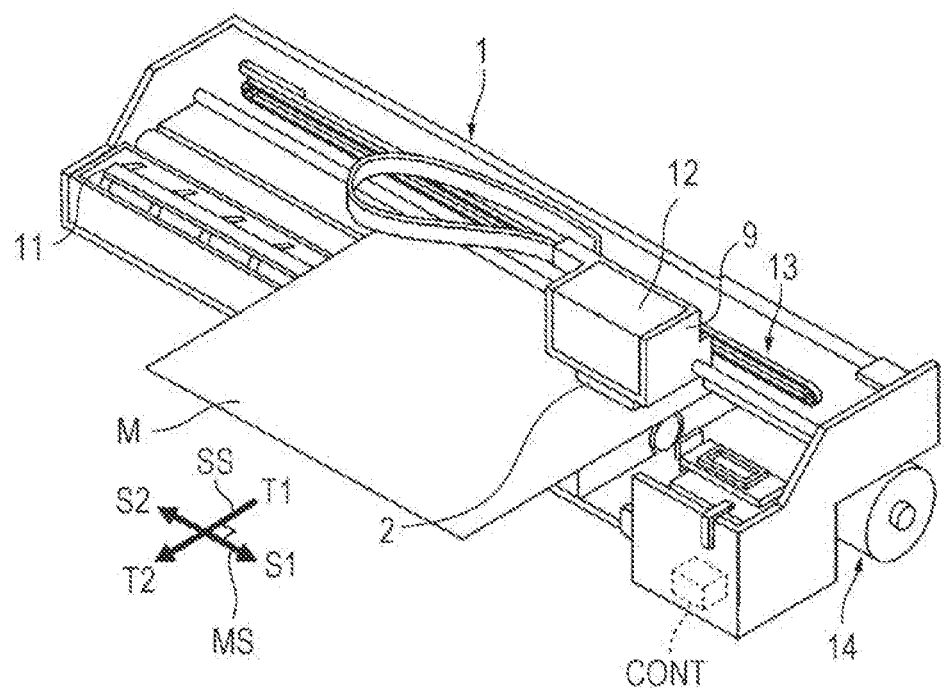
FIG. 2 is a schematic view around a carriage of an example of an ink jet recording device.

FIG. 1 is a schematic cross-sectional view schematically showing an ink jet recording device. FIG. 2 is a perspective view showing an example of a configuration around a carriage of an ink jet recording device 1 of FIG. 1. As shown in FIGS. 1 and 2, the ink jet recording device 1 includes an ink jet head 2, an IR heater 3, a platen heater 4, a heating heater 5, a cooling fan 6, a preheater 7, a ventilation fan 8, a carriage 9, a platen 11, a carriage moving mechanism 13, a transport unit 14, and a controller CONT. In the ink jet recording device 1, the operation of the entire ink jet recording device 1 is controlled by the controller CONT shown in FIG. 2.

The ink jet head 2 has a configuration in which recording is performed on a recording medium M by ejecting an ink composition or a treatment liquid from a nozzle of the ink jet head 2 and adhering thereon. In the present embodiment, the ink jet head 2 is a serial type ink jet head, and is scanned multiple times in a main scanning direction relative to the recording medium M to cause the ink to be adhered to the recording medium M. The ink jet head 2 is installed on the carriage 9 shown in FIG. 2. The ink jet head 2 is scanned multiple times in the main scanning direction relative to the recording medium M by an operation of the carriage moving mechanism 13 that moves the carriage 9 in a medium width direction of the recording medium M. The medium width direction is the main scanning direction of the ink jet head 2. Scanning in the main scanning direction is also referred to as main scanning.

In addition, here, the main scanning direction is a direction in which the carriage 9 on which the ink jet head 2 is installed moves. In FIG. 1, the main scanning direction is a direction intersecting a sub-scanning direction, which is a transport direction of the recording medium M indicated by the arrow SS. In FIG. 2, a width direction of the recording medium M, that is, a direction represented by S1↔S2 is a main scanning direction MS, and a direction represented by T1→T2 is a sub-scanning direction SS. In addition, scanning is performed in the main scanning direction, that is, in a direction of either the arrow S1 or the arrow S2 in one scan. Then, the main scanning of the ink jet head 2 and a sub-scanning, which is the transport of the recording medium M, are repeated multiple times to perform recording on the recording medium M. That is, the ink adhering step or the treatment liquid adhering step is performed by a plurality of main scanning in which the ink jet head 2 moves in the main scanning direction and a plurality of sub-scanning in which the recording medium M moves in the sub-scanning direction intersecting the main scanning direction.

The cartridge 12 that supplies each ink composition or treatment liquid to the ink jet head 2 includes a plurality of independent cartridges. The cartridge 12 is detachably mounted on the carriage 9 in which the ink jet head 2 is installed. Each of the plurality of cartridges may be filled with different types of ink compositions or treatment liquids, and the ink composition or the treatment liquid is supplied to each nozzle from the cartridge 12. In the present embodiment, an example in which the cartridge 12 is mounted on the carriage 9 is shown, but the cartridge 12 is not limited to this, and may be in the form of being provided on a site other than the carriage 9 and supplied to each nozzle through a supply pipe not shown in the figure.

A method known in the related art can be used for ejecting of the ink jet head 2. In the present embodiment, a method of ejecting droplets by using vibration of a piezoelectric element, that is, an ejection method of forming ink droplets by mechanical deformation of an electrostrictive element is used.

The ink jet recording device 1 includes the ventilation fan 8, the IR heater 3, and the platen heater 4 for drying the ink composition ejected from the ink jet head 2 and adhered to the recording medium M. The primary drying step can be performed by appropriately using these ventilation fan 8, the IR heater 3, and the platen heater 4 in combination. In the primary drying step, it is not always necessary to heat the recording medium M, and the ventilation fan 8 may be used alone for carrying out the normal temperature air blowing.

When the IR heater 3 is used, the recording medium M can be radially heated by infrared radiation from the ink jet head 2 side. Due to this, the ink jet head 2 is also likely to be heated at the same time, but the temperature can be raised without being affected by a thickness of the recording medium M as compared with the case of being heated from a back surface of the recording medium M such as the platen heater 4. In addition, there may be provided various fans (for example, ventilation fan 8), which blow warm air or air having the same temperature as the environment to the recording medium M to dry the ink on the recording medium M.

The platen heater 4 can heat the recording medium M at a position facing the ink jet head 2 through the platen 11 so that the ink composition ejected by the ink jet head 2 can be dried early from a time when being adhered to the recording medium M. The platen heater 4 can heat the recording medium M in a conductive manner, and in the recording method of the present embodiment, the ink composition can be adhered to the recording medium M heated in this manner. Therefore, the ink composition can be fixed on the recording medium M early, and the image quality can be improved.

The heating heater 5 is a heater for drying and solidifying the ink composition adhered to the recording medium M, that is, a heater for secondary heating or secondary drying. The heating heater 5 can be used in the secondary drying step. As the heating heater 5 heats the recording medium M on which the image is recorded, moisture and the like contained in the ink composition evaporate and scatter more quickly, and a fixing resin that can be contained in the ink composition forms an ink film. In this way, the ink film is firmly fixed or adhered onto the recording medium M to have excellent film-forming properties, and an excellent high-quality image can be obtained in a short time.

The ink jet recording device 1 may include the cooling fan 6. After the ink composition recorded on the recording medium M is dried, the ink composition on the recording medium M is cooled by the cooling fan 6, and thus an ink coating film can be made on the recording medium M with good adhesion properties.

In addition, the ink jet recording device 1 may include the preheater 7 that preheats the recording medium M before the ink composition is adhered to the recording medium M. In addition, the ink jet recording device 1 may include the ventilation fan 8 so that the ink composition adhered to the recording medium M is dried more efficiently.

Below the carriage 9, there are provided the platen 11 that supports the recording medium M, the carriage moving mechanism 13 that moves the carriage 9 relative to the recording medium M, and the transport unit 14 which is a roller that transports the recording medium M in the sub-scanning direction. The operations of the carriage moving mechanism 13 and the transport unit 14 are controlled by the controller CONT.

In FIGS. 1 and 2, a serial type ink jet recording device is used, but a line type ink jet recording device can also be used. The ink jet recording device exemplified above can be preferably used for carrying out the recording method according to the present embodiment.

3. Example

Hereinafter, the present disclosure will be described in more detail with reference to examples, but the present disclosure is not limited to these examples. Hereinafter, "%" is based on mass unless otherwise specified.

3.1 Preparation of Ink Jet Ink Composition

Each component was put in a container so as to have the compositions shown in Tables 1 and 2, mixed and stirred with a magnetic stirrer for 2 hours, and then filtered through a membrane filter having a pore size of 5 μm to obtain an ink jet ink composition according to each example and comparative example. The numerical values in the table of pigments and resin components represent the solid contents thereof. Pure water was added so that the total mass of the composition was 100% by mass. In addition, as the pigments, a pigment dispersion prepared in advance by the following procedure was used.

Preparation of Pigment Dispersion

In a reaction container equipped with a reflux tube, a gas introduction device, a thermometer, and a stirrer, 198.2 parts of diethylene glycol monobutyl ether, 1.0 part of iodine, 3.7 parts of 2,2'-azobis (4-methoxy-2,4-dimethyl valeronitrile), 66.1 parts of tricyclodecyl methacrylate, and 0.17 parts of diphenylmethane as a catalyst were further charged. The polymerization was performed at 45° C. for 5 hours during flowing of nitrogen, and a solution of an A block polymer was obtained.

Next, the temperature of polymerization was lowered to 40° C., and the solution of the A block polymer obtained above was added with 44.0 parts of tricyclodecyl methacrylate, 17.2 parts of methacrylic acid, and 1.2 parts of 2,2'-azobis(4-methoxy-2,4-dimethylvaleronitrile). Then, the polymerization was performed for 4 hours, then the mixture was heated to 70° C. and polymerized for 1 hour to form a B block polymer, and a solution of an A-B block polymer was obtained.

After cooling the solution of the A-B block polymer obtained above, 66.1 parts of diethylene glycol monobutyl ether were added thereto and dried at 150° C. for 1 hour, and then a solid content having a solid content of 33.0% was obtained. 341 parts of the above-mentioned polymer, 163.6 parts of butyl carbitol, and 450 parts of C.I. Pigment Blue 15:3, which is a cyan pigment, were blended and stirred with a disperser. Next, the pigment was sufficiently dispersed by a horizontal media dispersion machine to obtain an oily pigment dispersion. Next, stirring 700 parts of the oily pigment dispersion obtained above with a disperser, a mixture solution made of 4.0 parts of potassium hydroxide and 341 parts of water was gradually added for neutralization, and phase transition was caused. Next, the pigment was sufficiently dispersed by the horizontal media dispersion machine again to obtain an aqueous pigment dispersion.

TABLE 1

| | | | Ink A | Ink B | Ink C | Ink D | Ink E | Ink F | Ink G | Ink H | Ink I |
|---|---|---|---|---|---|---|---|---|---|---|---|
| Water-soluble low-molecular organic compound | Specific alkanediols | 1,2HD (boiling point 224° C.) | 2 | 2 | 2 | 2 | 2 | 2 | 2 | 2 | 2 |
| | | 1,2PD (boiling point 210° C.) | | | | | | | | | |
| | | 1,2BD (boiling point 194° C.) | 18 | 18 | 18 | 18 | 18 | 18 | 18 | 18 | 18 |
| | Other alkanediols | PG (boiling point 188° C.) | | | | | | | | | |
| | | 1,3PD (boiling point 213° C.) | | | | | | | | | |
| | Other compounds | 2P (boiling point 245° C.) | | | | | | | | | |
| Surfactant | Specific silicone-based surfactant | BYK-3420 | 0.5 | | | | | | | | |
| | | Silface SAG502 | | 0.5 | | | | | | | |
| | Other silicone-based surfactants | Silface SAG503A | | | 0.5 | | | | | | |
| | | Silface SAG005 | | | | 0.5 | | | | | |
| | | BYK-349 | | | | | 0.5 | | | | |
| | | BYK-333 | | | | | | 0.5 | | | |
| | | BYK-3480 | | | | | | | 0.5 | | |
| | Non-silicone-based | Olfine E1010 | | | | | | | | 0.5 | |

TABLE 1-continued

|  |  | Ink A | Ink B | Ink C | Ink D | Ink E | Ink F | Ink G | Ink H | Ink I |
|---|---|---|---|---|---|---|---|---|---|---|
| Pigment dispersion | Cyan pigment (effective component) | 2 | 2 | 2 | 2 | 2 | 2 | 2 | 2 | 2 |
| Resin particle | Acrylic Joncryl 631 (effective component) | 5 | 5 | 5 | 5 | 5 | 5 | 5 | 5 | 5 |
| | Pure water | Residue | Residue | Residue | Residue | Residue | Residue | Residue | Residue | Residue |
| | Sum | 100 | 100 | 100 | 100 | 100 | 100 | 100 | 100 | 100 |
| | Total amount of water-soluble low-molecular organic compound | 20 | 20 | 20 | 20 | 20 | 20 | 20 | 20 | 20 |
| | Proportion of water-soluble low-molecular organic compound at a standard boiling point of 215° C. or lower | 90% | 90% | 90% | 90% | 90% | 90% | 90% | 90% | 90% |

TABLE 2

|  |  |  | Ink J | Ink K | Ink L | Ink M | Ink N | Ink O | Ink P | Ink Q |
|---|---|---|---|---|---|---|---|---|---|---|
| Water-soluble low-molecular organic compound | Specific alkanediols | 1,2HD (boiling point 224° C.) | 2 | | | 7 | | 2 | 2 | 2 |
| | | 1,2PD (boiling point 210° C.) | | 2 | | | | | | |
| | | 1,2BD (boiling point 194° C.) | | | 2 | | | | | |
| | Other alkanediols | PG (boiling point 188° C.) | 18 | 18 | 18 | 13 | 20 | 27 | | |
| | | 1,3PD (boiling point 213° C.) | | | | | | | 18 | |
| | Other compounds | 2P (boiling point 245° C.) | | | | | | | | 18 |
| Surfactant | Specific silicone-based surfactant | BYK-3420 | 1.5 | 0.5 | 0.5 | 0.5 | 0.5 | 0.5 | 0.5 | 0.5 |
| | | Silface SAG502 | | | | | | | | |
| | Other silicone-based surfactants | Silface SAG503A | | | | | | | | |
| | | Silface SAG005 | | | | | | | | |
| | | BYK-349 | | | | | | | | |
| | | BYK-333 | | | | | | | | |
| | | BYK-3480 | | | | | | | | |
| | Non-silicone-based | Olfine E1010 | | | | | | | | |
| Pigment dispersion | | Cyan pigment (effective component) | 2 | 2 | 2 | 2 | 2 | 2 | 2 | 2 |
| Resin particle | Acrylic | Joncryl 631 (effective component) | 5 | 5 | 5 | 5 | 5 | 5 | 5 | 5 |
| | | Pure water | Residue | Residue | Residue | Residue | Residue | Residue | Residue | Residue |
| | | Sum | 100 | 100 | 100 | 100 | 100 | 100 | 100 | 100 |
| | | Total amount of water-soluble low-molecular organic compound | 20 | 20 | 20 | 20 | 20 | 29 | 20 | 20 |
| | | Proportion of water-soluble low-molecular organic compound at a standard boiling point of 215° C. or lower | 90% | 100% | 100% | 65% | 100% | 93% | 90% | 0% |

3.2 Preparation of Treatment Liquid

Each component was put in a container so as to have the composition shown in Table 3, mixed and stirred with a magnetic stirrer for 2 hours, and then filtered through a membrane filter having a pore diameter of 5 μm to obtain treatment liquids A to C. The numerical value in the table of the cationic resin represents the solid content. Pure water was added so that the total mass of the composition was 100% by mass.

TABLE 3

|  |  |  | Treatment liquid A | Treatment liquid B | Treatment liquid C |
|---|---|---|---|---|---|
| Water-soluble low-molecular organic compound | Alkanediols | 1,2HD (boiling point of 224° C.) | 2 | 2 | 2 |
|  |  | PG (boiling point of 188° C.) | 15 | 15 | 15 |
| Aggregating agent | Polyvalent metal salt | Calcuim formate | 3 |  |  |
|  | Cationic resin | Cationmaster PD-7 (effective component) |  | 3 |  |
|  | Organic acid | Succinic acid |  |  | 3 |
| Surfactant | Silicone-based | BYK-3420 | 0.5 | 0.5 | 0.5 |
|  | Pure water |  | Residue | Residue | Residue |
|  | Sum |  | 100 | 100 | 100 |

Explanations regarding Tables 1 to 3 will be supplemented.

Water-soluble low-molecular-weight organic compound 1,2HD (1,2-hexanediol, 1,2-alkanediol having 6 carbon atoms, 25° C. property:liquid)

1,2PD (1,2-pentanediol, 1,2-alkanediol having 5 carbon atoms, 25° C. property:liquid)

1,2BD (1,2-butanediol, 1,2-alkanediol having 4 carbon atoms, 25° C. property:liquid)

PG (propylene glycol, 1,2-alkanediol having 3 carbon atoms, 25° C. property:liquid)

1,3PD (1,3-propanediol, alkanediol having 3 carbon atoms, 25° C. property:liquid)

2P (2-pyrrolidone, amides, 25° C. property:liquid)

Aggregating Agent

Catiomaster PD-7 (Yokkaichi Chemical Co. Ltd., amine/epichlorohydrin-based cationic resin)

Surfactant

BYK-3420 (BYK Japan KK, silicone-based surfactant)

Silface SAG502 (Nissin Chemical Industry Co., Ltd., silicone-based surfactant)

Silface SAG503A (Nissin Chemical Industry Co., Ltd., silicone-based surfactant)

Silface SAG005 (Nissin Chemical Industry Co., Ltd., silicone-based surfactant)

BYK-349 (BYK Japan KK, silicone-based surfactant)

BYK-333 (BYK Japan KK, silicone-based surfactant)

BYK-3480 (BYK Japan KK, silicone-based surfactant)

Olfine E1010 (Nissin Chemical Industry Co., Ltd., acetylene-based surfactant)

A cloud point and a surface tension of the above-mentioned surfactants were measured based on the following evaluation methods, and the measurement results were described in Table 4.

Cloud Point

A solution mixed at a mass ratio of silicone-based surfactant:propylene glycol:water=1:9:90 was stirred for 30 minutes or more. Thereafter, 20 g of the mixture solution was placed in a 30 mL sample bottle, and left in a constant temperature bath of 25° C./40° C./50° C./60° C./70° C. for 1 day. A state after being left for 1 day was visually observed and determined by the following criteria. When the liquid is in a mixed state (liquid is transparent), it can be determined that the liquid has a cloud point having a temperature equal to or higher than a predetermined temperature. On the other hand, when liquid is in a cloudiness state or is in a state in which a separated product is present, it can be determined that the liquid does not have a cloud point equal to or higher than a predetermined temperature.

Criteria

A: Mixed state (liquid is transparent).

B: Cloudiness state, or separated product is present.

Surface Tension

A solution mixed at a mass ratio of silicone-based surfactant:water=0.1:99.9 and a solution mixed at a mass ratio of silicone-based surfactant:propylene glycol=0.1:99.9 were stirred for 30 minutes or more. The solution after stirring was measured by a Wilhelmy method using a platinum plate in an environment of 25° C. using an automatic surface tension meter CBVP-Z (manufactured by Kyowa Interface Science Co., Ltd.).

TABLE 4

|  | Product name | Cloud point | | | | | Surface tension (mN/m) | |
|---|---|---|---|---|---|---|---|---|
|  |  | 25° C. | 40° C. | 50° C. | 60° C. | 70° C. | (1) water | (2) PG |
| Specific silicone-based surfactant | BYK-3420 | A | A | A | B | B | 26.0 | 27.2 |
|  | Silface SAG502 | A | A | A | B | B | 23.8 | 28.5 |
| Other silicone-based surfactants | Silface SAG503A | A | A | A | A | A | 21.6 | 36.3 |
|  | Silface SAG005 | A | A | A | B | B | 30.3 | 22.2 |
|  | BYK-349 | A | A | B | B | B | 21.9 | 33.9 |
|  | BYK-333 | A | A | B | B | B | 31.6 | 22.3 |
|  | BYK-3480 | B | B | B | B | B | 21.4 | 24.1 |
| Non-silicone-based | Olfine E1010 | A | A | A | A | B | — | — |

From the results of Table 4, BYK-3420 and Silface SAG502 were silicone-based surfactants (specific silicone-based surfactant) which have a cloud point of 30° C. or higher when mixed at a mass ratio of silicone-based surfactant:propylene glycol:water=1:9:90, and in which a surface tension of 30 mN/m or less in each of a 0.1% by mass aqueous solution and a 0.1% by mass propylene glycol solution. On the other hand, Silface SAG503A, Silface SAG005, BYK-349, BYK-333, BYK-3480, and OLFINE E1010 did not correspond to the specific silicone-based surfactant.

Resin Particles

Joncryl 631 (BASF Japan Ltd., styrene acrylic resin emulsion)

3.3 Evaluation Method

Recorded materials according to each example and each comparative example were prepared under the following recording conditions and evaluated based on the following methods.

3.3.1 Recording Condition

Printing machine: "SC-R5050" modification machine manufactured by Seiko Epson Corporation.

Resolution: 1200×1200 dpi.

Print pattern: Solid pattern (cyan single color).

Number of times of scanning: 9 times.

Paper surface temperature (primary drying temperature): described in Tables 5 to 7, when the temperature was 25° C., the air volume was adjusted and only air blowing was performed, and when the temperature was 30° C. or higher, adjustment was performed using a platen heater, and the paper surface temperature was measured by installing a thermocouple on a recording medium.

Secondary drying temperature: 70° C., measured by installing a thermocouple on the recording medium.

Recording medium: M1 (Orajet 3165G-010, Orafol Japan, PVC film), M2 (plain paper roll (thick), Seiko Epson Corporation, plain paper).

Platen gap: 1.7 mm.

A nozzle row of the head of the above-mentioned printing machine was filled with the ink and the treatment liquid and recording was performed. In the example using the treatment liquid, the ink and the treatment liquid were ejected and adhered to the same main scanning region by the same main scanning.

3.3.2 Image Quality (Aggregation Unevenness)

A SC-R5050 modification machine was filled with an ink set, and based on the above-mentioned recording conditions and the conditions described in Tables 5 to 7, a solid pattern (each solid pattern in which the adhesion amount (Duty) to the maximum ink adhesion amount is reduced in units of 10% by mass when ink adhesion amount is maximum 20 mg/inch$^2$, and the treatment liquid is adhered by 10% by mass to the ink) was printed on a recording medium. The printed matter was visually observed and evaluated according to the following criteria. The aggregation unevenness is the appearance of ink color non-uniform in the solid pattern. It can be said that favorable image quality (aggregation unevenness) is obtained in an evaluation of B or higher.

Evaluation Criteria

A: Aggregation unevenness cannot be visually recognized in a pattern of 90% by mass.

B: Aggregation unevenness can be visually recognized in the pattern of 90% by mass, but cannot be visually recognized in a pattern of 80% by mass.

C: Aggregation unevenness can be visually recognized even in the pattern of 80% by mass.

3.3.3 Image Quality (Embedding)

A SC-R5050 modification machine was filled with an ink set, and based on the above-mentioned recording conditions and the conditions described in Tables 5 to 7, a solid pattern having the same image quality evaluation as the above-mentioned image quality (aggregation unevenness) evaluation was recorded on a recording medium. The printed matter was visually observed and evaluated according to the following criteria. It can be said that favorable image quality (embedding) is obtained in an evaluation of B or higher. When the embedding is poor, the background color of the recording medium is visually recognized (white spots).

Evaluation Criteria

A: White spots cannot be visually recognized in a pattern of 60% by mass.

B: White spots can be visually recognized in the pattern of 60% by mass, but cannot be visually recognized in the pattern of 70% by mass.

C: White spots can be visually recognized even in a pattern of 70% by mass.

3.3.4 Ink Landing Deviation

A SC-R5050 modification machine was filled with an ink, a recording medium was set, and a nozzle check pattern was recorded immediately after performing flushing (pre-ejecting operation), thereby confirming normal ejection. Thereafter, continuous printing was performed under the above-mentioned recording conditions and the temperature conditions/printing time described in Tables 5 to 7, and then the nozzle check pattern was recorded. The landing deviation of the ink after the idle operation was compared and evaluated according to the following criteria. It can be said that the ink landing deviation can be favorably suppressed in an evaluation of B or higher.

An average value was used in all nozzles. However, the non-ejection nozzle was excluded. The treatment liquid was excluded from the evaluation target.

Evaluation Criteria

AA: There is a deviation of half or less of the distance between the nozzles.

A: There is a deviation within the distance between the nozzles.

B: There is a deviation of 1 to 2 times the distance between the nozzles.

C: There is a deviation of more than 2 times the distance between the nozzles.

3.3.5 Abrasion Resistance

A SC-R5050 modification machine was filled with an ink, and based on the above-mentioned recording conditions and conditions described in Tables 5 to 7, a solid pattern (ink adhesion amount of 12 mg/inch$^2$, treatment liquid adhesion amount of 1 mg/inch$^2$) was printed on the recording medium. After being left to stand at room temperature for 30 minutes, an ink adhering portion was cut into a 25×150 mm of rectangular shape, and a degree of ink peeling when rubbed 100 times with a Gakushin type abrasion resistance tester (load 500 g) using a plain weave cloth wet with water was visually evaluated and evaluated according to the following criteria. It can be said that favorable abrasion resistance is obtained with an evaluation of B or higher.

Evaluation Criteria

AA: There is no peeling.

A: There is peeling of less than 20% of the evaluation area.

B: There is peeling of less than 50% of the evaluation area.

C: There is peeling of 50% or more of the evaluation area.

TABLE 5

|  | Example 1 | Example 2 | Example 3 | Example 4 | Example 5 | Example 6 | Example 7 | Example 8 | Example 9 |
|---|---|---|---|---|---|---|---|---|---|
| Ink | Ink A | Ink B | Ink J | Ink K | Ink L | Ink M | Ink N | Ink O | Ink P |
| Treatment liquid | Treatment liquid A | Treatment liquid A | Treatment liquid A | Treatment liquid A | Treatment liquid A | Treatment liquid A | Treatment liquid A | Treatment liquid A | Treatment liquid A |
| Recording medium | M1 | M1 | M1 | M1 | M1 | M1 | M1 | M1 | M1 |
| Ejected ink temperature | 38° C. | 38° C. | 38° C. | 38° C. | 38° C. | 38° C. | 38° C. | 38° C. | 38° C. |
| Paper surface temperature | 40° C. | 40° C. | 40° C. | 40° C. | 40° C. | 40° C. | 40° C. | 40° C. | 40° C. |
| On-paper air velocity | 3 m/s | 3 m/s | 3 m/s | 3 m/s | 3 m/s | 3 m/s | 3 m/s | 3 m/s | 3 m/s |
| Continuous printing time | 2 hours | 2 hours | 2 hours | 2 hours | 2 hours | 2 hours | 2 hours | 2 hours | 2 hours |
| Image quality (aggregation unevenness) | A | A | A | A | A | A | A | A | A |
| Image quality (embedding) | A | A | A | B | B | A | B | A | A |
| Ink landing deviation | A | A | B | A | B | AA | B | B | AA |
| Abrasion resistance | A | A | B | A | A | B | A | B | B |

TABLE 6

|  | Example 10 | Example 11 | Example 12 | Example 13 | Example 14 | Example 15 | Example 16 | Example 17 | Example 18 |
|---|---|---|---|---|---|---|---|---|---|
| Ink | Ink Q | Ink A | Ink A | Ink A | Ink A | Ink A | Ink A | Ink A | Ink A |
| Treatment liquid | Treatment liquid A | Treatment liquid A | Treatment liquid A | Treatment liquid A | Treatment liquid A | Treatment liquid A | Treatment liquid B | Treatment liquid C | — |
| Recording medium | M1 | M1 | M1 | M1 | M1 | M1 | M1 | M1 | M1 |
| Ejected ink temperature | 38° C. | 25° C. | 47° C. | 38° C. | 38° C. | 38° C. | 38° C. | 38° C. | 38° C. |
| Paper surface temperature | 40° C. | 25° C. | 50° C. | 40° C. | 40° C. | 40° C. | 40° C. | 40° C. | 40° C. |
| On-paper air velocity | 3 m/s | 3 m/s | 3 m/s | 4 m/s | 0 m/s | 3 m/s | 3 m/s | 3 m/s | 3 m/s |
| Continuous printing time | 2 hours | 2 hours | 2 hours | 2 hours | 2 hours | 1 hours | 2 hours | 2 hours | 2 hours |
| Image quality (aggregation unevenness) | A | B | A | A | B | A | A | B | B |
| Image quality (embedding) | A | A | A | A | A | A | A | A | A |
| Ink landing deviation | AA | AA | B | B | AA | AA | A | A | A |
| Abrasion resistance | C | A | A | A | A | A | A | A | AA |

TABLE 7

| | Comparative Example 1 | Comparative Example 2 | Comparative Example 3 | Comparative Example 4 | Comparative Example 5 | Comparative Example 6 | Comparative Example 7 | Reference Example 1 | Reference Example 2 |
|---|---|---|---|---|---|---|---|---|---|
| Ink | Ink C | Ink D | Ink E | Ink F | Ink G | Ink H | Ink I | Ink C | Ink C |
| Treatment liquid | Treatment liquid A | Treatment liquid A | Treatment liquid A | Treatment liquid A | Treatment liquid A | Treatment liquid A | Treatment liquid A | — | Treatment liquid A |
| Recording medium | M1 | M1 | M1 | M1 | M1 | M1 | M1 | M1 | M2 |
| Ejected ink temperature | 38° C. | 38° C. | 38° C. | 38° C. | 38° C. | 38° C. | 38° C. | 38° C. | 38° C. |
| Paper surface temperature | 40° C. | 40° C. | 40° C. | 40° C. | 40° C. | 40° C. | 40° C. | 40° C. | 40° C. |
| On-paper air velocity | 3 m/s | 3 m/s | 3 m/s | 3 m/s | 3 m/s | 3 m/s | 3 m/s | 3 m/s | 3 m/s |
| Continuous printing time | 2 hours | 2 hours | 2 hours | 2 hours | 2 hours | 2 hours | 2 hours | 2 hours | 2 hours |
| Image quality (aggregation unevenness) | A | A | A | A | A | A | A | C | A |
| Image quality (embedding) | C | C | C | C | A | C | C | B | A |
| Ink landing deviation | A | A | B | B | C | A | A | A | A |
| Abrasion resistance | A | A | A | A | A | A | AA | AA | — |

3.4 Evaluation Results

The evaluation results were shown in Tables 5 to 7. In each example relating to an aqueous ink jet ink composition containing a color material, a silicone-based surfactant, and a water-soluble low-molecular-weight organic compound, which is used in recording on a recording medium that is a low-absorptive recording medium or a non-absorptive recording medium, in which the silicone-based surfactant has a cloud point of 30° C. or higher when mixed at a mass ratio of silicone-based surfactant:propylene glycol:water=1: 9:90, and has a surface tension of 30 mN/m or less in each of a 0.1% by mass aqueous solution and a 0.1% by mass propylene glycol solution, an excellent image quality (embedding) was obtained, and the suppression of the landing position deviation was excellent. In contrast, in each of the Comparative Examples, which were not as above, the image quality (embedding) or the suppression of the landing position deviation was poor.

From comparison between Example 1 and Comparative Examples 1 to 7, when the specific silicone-based surfactant was used, an excellent image quality (embedding) was obtained, and the suppression of the landing position deviation was excellent.

From the results of Examples 1 and 18 and Reference Example 1, when a treatment liquid was used, the image quality (aggregation unevenness) was more excellent. In addition, from the results of Example 1, Comparative Example 1, and Reference Example 2, when the low-absorptive recording medium or the non-absorptive recording medium was not used as the recording medium, image quality (embedding) deterioration did not occur. In Reference Example 2, the paper as the recording medium was torn, and evaluation of abrasion resistance was not possible.

From the results of Examples 1 and 2, in various specific silicone-based surfactants, excellent image quality (embedding) was obtained, and the suppression of landing position deviation was excellent.

From the results of Examples 1 and 3, in a wide range of the content of the specific silicone-based surfactant, excellent image quality (embedding) was obtained and the suppression of the landing position deviation was excellent.

From the results of Examples 1, 4, 5, and 7, when 1,2-alkanediols (specific alkanediols) having 4 or more carbon atoms and 6 or less carbon atoms were included, there was a tendency that the image quality (embedding) and the suppression of the landing position deviation were more excellent.

From the results of Examples 1, 6, and 10, when the water-soluble low-molecular-weight organic compound having a standard boiling point of 215° C. or lower was within a predetermined range, the abrasion resistance tended to be more excellent.

From the results of Examples 1 and 8, when the content of the water-soluble low-molecular-weight organic compound was within a predetermined range, the abrasion resistance tended to be more excellent.

From the results of Examples 1, 9, and 10, in various water-soluble low-molecular-weight organic compounds, excellent image quality (embedding) was obtained and suppression of the landing position deviation was excellent.

From the results of Examples 1 and 11, even when the primary drying step by heating was included, excellent image quality could be obtained, and the suppression of the landing position deviation was excellent.

From the results of Examples 1 and 12, even when the heating temperature in the primary drying step was high, excellent image quality could be obtained, and the suppression of the landing position deviation was excellent.

From the results of Examples 1, 13, and 14, even when the air blowing step was included, there was a tendency that the image quality (embedding) and the suppression of ink landing position deviation were excellent, bleeding could be further suppressed, and the image quality (aggregation unevenness) was more excellent.

From the results of Examples 1 and 15, even when the continuous recording time was long, the suppression of the landing position deviation was excellent.

From the results of Examples 1, 16, and 17, in various aggregating agents in the treatment liquid, excellent image quality could be obtained, and the suppression of the landing position deviation was excellent.

The following contents are derived from the above-described embodiment.

An aspect of the ink jet ink composition is an aqueous ink jet ink composition containing a color material, a silicone-based surfactant, and a water-soluble low-molecular-weight organic compound, in which the ink jet ink composition is used for recording on a recording medium that is a low-absorptive recording medium or a non-absorptive recording medium, and the silicone-based surfactant has a cloud point of 30° C. or higher when mixed at a mass ratio of silicone-based surfactant:propylene glycol:water=1:9:90, and has a surface tension of 30 mN/m or less in each of a 0.1% by mass aqueous solution and a 0.1% by mass propylene glycol solution.

In an aspect of the above-mentioned ink jet ink composition, the cloud point may be higher than 50° C.

In any aspect of the above-mentioned ink jet ink composition, a content of the above-mentioned silicone-based surfactant may be 2% by mass or less with respect to a total mass of the ink composition.

In any aspect of the above-mentioned ink jet ink composition, as the above-mentioned water-soluble low-molecular-weight organic compound, 1,2-alkanediol having 4 or more and 6 or less carbon atoms may be contained in an amount of 1% by mass or more and 7% by mass or less with respect to a total mass of the ink composition.

In any aspect of the above-mentioned ink jet ink composition, a content of the water-soluble low-molecular-weight organic compound may be 30% by mass or less with respect to a total mass of the ink composition.

In any aspect of the above-mentioned ink jet ink composition, a water-soluble low-molecular-weight organic compound having a standard boiling point of 215° C. or lower may be 60% by mass or more with respect to a total mass of the above-mentioned water-soluble low-molecular-weight organic compound.

In any aspect of the above-mentioned ink jet ink composition, the composition may be used in a recording method including a step of adhering a treatment liquid containing an aggregating agent to the recording medium.

In any aspect of the above-mentioned ink jet ink composition, the ink jet ink composition may be used in a recording method including a primary drying step of drying the ink jet ink composition adhered to the recording medium, when adhering the ink jet ink composition to the recording medium.

An aspect of the recording method includes an adhering step of ejecting the ink jet ink composition of the above-mentioned aspect from an ink jet head and adhering the ink jet ink composition to a recording medium which is a low-absorptive recording medium or a non-absorptive recording medium.

In an aspect of the recording method, a primary drying step by heating may be included, in which a surface temperature of the recording medium is 28° C. or higher and 55° C. or lower at a time of adhesion of the ink jet ink composition.

In any aspect of the recording method, an air blowing step of air blowing at an air velocity of 1 m/s or more and 4 m/s or less at a time of adhesion of the ink jet ink composition may be included.

In any aspect of the recording method, the ink jet ink composition may be continuously recorded on the recording medium for one hour or more.

In any aspect of the recording method, the adhering step may include an ink adhering step of ejecting and recording the ink jet ink composition in a state of being heated to 28° C. or higher and 50° C. or lower.

The present disclosure is not limited to the above-described embodiment, and various modifications can be done. For example, the present disclosure includes a configuration substantially the same as the configuration described in the embodiment, for example, a configuration having the same function, method, and result, or a configuration having the same object and effect. In addition, the present disclosure also includes a configuration in which a non-essential part of the configuration described in the embodiment is replaced. In addition, the present disclosure includes a configuration that exhibits the same effects as the configuration described in the embodiment or a configuration that can achieve the same object. In addition, the present disclosure includes a configuration in which a known technique is added to the configuration described in the embodiment.

What is claimed is:

1. An aqueous ink jet ink composition comprising:
   a color material;
   a silicone-based surfactant; and
   a water-soluble low-molecular-weight organic compound, wherein
   the ink jet ink composition is used for recording on a recording medium that is a low-absorptive recording medium or a non-absorptive recording medium, and the silicone-based surfactant has a cloud point of 30° C. or higher when mixed at a mass ratio of silicone-based surfactant:propylene glycol:water=1:9:90, and has a surface tension of 30 mN/m or less in each of a 0.1% by mass aqueous solution and a 0.1% by mass propylene glycol solution.

2. The ink jet ink composition according to claim 1, wherein
   the cloud point is higher than 50° C.

3. The ink jet ink composition according to claim 1, wherein
   a content of the silicone-based surfactant is 2% by mass or less with respect to a total mass of the ink composition.

4. The ink jet ink composition according to claim 1, wherein
   the ink jet ink composition contains, as the water-soluble low-molecular-weight organic compound, 1,2-alkanediol having 4 or more and 6 or less carbon atoms in an amount of 1% by mass or more and 7% by mass or less with respect to a total mass of the ink composition.

5. The ink jet ink composition according to claim 1, wherein
   a content of the water-soluble low-molecular-weight organic compound is 30% by mass or less with respect to a total mass of the ink composition.

6. The ink jet ink composition according to claim 1, wherein a water-soluble low-molecular-weight organic compound having a standard boiling point of 215° C. or lower is 60% by mass or more with respect to a total mass of the water-soluble low-molecular-weight organic compound.

7. The ink jet ink composition according to claim 1, which is used in a recording method including adhering a treatment liquid containing an aggregating agent to the recording medium.

8. The ink jet ink composition according to claim 1, which is used in a recording method including a primary drying step of drying the ink jet ink composition adhered to the recording medium, when adhering the ink jet ink composition to the recording medium.

9. A recording method comprising:

an adhering step of ejecting the ink jet ink composition according to claim 1 from an ink jet head and adhering the ink jet ink composition to a recording medium which is a low-absorptive recording medium or a non-absorptive recording medium.

10. The recording method according to claim 9, further comprising:

a primary drying step by heating, wherein a surface temperature of the recording medium is 28° C. or higher and 55° C. or lower at a time of adhesion of the ink jet ink composition.

11. The recording method according to claim 9, further comprising:

an air blowing step of air blowing at an air velocity of 1 m/s or more and 4 m/s or less at a time of adhesion of the ink jet ink composition.

12. The recording method according to claim 9, wherein the ink jet ink composition is continuously recorded on the recording medium for one hour or more.

13. The recording method according to claim 9, wherein the adhering step includes an ink adhering step of ejecting and recording the ink jet ink composition in a state of being heated to 28° C. or higher and 50° C. or lower.

14. The recording method according to claim 9, further comprising:

a treatment liquid adhering step of adhering a treatment liquid containing an aggregating agent to the recording medium.

15. The ink jet ink composition according to claim 1, wherein the silicone-based surfactant has a cloud point of 30° C. or higher and less than 60° C. when mixed at a mass ratio of silicone-based surfactant:propylene glycol:water=1:9:90.

16. The ink jet ink composition according to claim 1, further comprising a fixing resin.

* * * * *